(12) United States Patent
Chen et al.

(10) Patent No.: US 12,432,770 B2
(45) Date of Patent: Sep. 30, 2025

(54) MULTIPLEXING TECHNIQUES FOR OVERLAPPING CHANNELS WITH DIFFERENT PRIORITIES

(71) Applicant: ZTE Corporation, Guangdong (CN)

(72) Inventors: Wei Chen, Guangdong (CN); Wei Gou, Guangdong (CN); Junfeng Zhang, Guangdong (CN); Peng Hao, Guangdong (CN); Shuaihua Kou, Guangdong (CN)

(73) Assignee: ZTE Corporation, Shenzhen (CN)

( * ) Notice: Subject to any disclaimer, the term of this patent is extended or adjusted under 35 U.S.C. 154(b) by 352 days.

(21) Appl. No.: 18/117,287

(22) Filed: Mar. 3, 2023

(65) Prior Publication Data

US 2023/0209590 A1 Jun. 29, 2023

Related U.S. Application Data

(63) Continuation of application No. PCT/CN2020/122327, filed on Oct. 21, 2020.

(51) Int. Cl.
*H04W 72/566* (2023.01)
*H04L 1/1607* (2023.01)
(Continued)

(52) U.S. Cl.
CPC ......... *H04W 72/569* (2023.01); *H04L 1/1671* (2013.01); *H04L 5/0055* (2013.01); *H04W 72/21* (2023.01)

(58) Field of Classification Search
None
See application file for complete search history.

(56) References Cited

U.S. PATENT DOCUMENTS 10,812,242 B2 10/2020 Choi et al.
10,966,234 B2 * 3/2021 Li ................. H04W 72/21
(Continued)

FOREIGN PATENT DOCUMENTS

CN 107432034 A 12/2017
CN 109618362 A 4/2019
(Continued)

OTHER PUBLICATIONS

CNIPA, First Office Action for Chinese Application No. 202080106426. 9, mailed on Jul. 30, 2024, 15 pages with unofficial English translation.
(Continued)

*Primary Examiner* — Brian S Roberts
(74) *Attorney, Agent, or Firm* — Perkins Coie LLP

(57) ABSTRACT

Techniques are described for multiplexing content that overlap in time domain on at least two channels. An example wireless communication method includes performing a first determination, by a communication node, that a high priority feedback message to be transmitted on a control channel overlaps in time domain with a low priority feedback message to be transmitted on the control channel; performing a second determination, by the communication node, whether a multiplexing operation between the high priority feedback message and the low priority feedback message is allowed; and transmitting, in response to the first determination and in response to determining that the multiplexing operation is allowed, a multiplexed information in a resource in the control channel.

18 Claims, 8 Drawing Sheets

(51) Int. Cl.
   *H04L 5/00*      (2006.01)
   *H04W 72/21*     (2023.01)

(56) References Cited

U.S. PATENT DOCUMENTS

| | | | |
|---|---|---|---|
| 11,265,853 B2* | 3/2022 | Kundu | H04L 5/0057 |
| 11,546,894 B2 | 1/2023 | Gao | |
| 11,870,587 B2* | 1/2024 | Yang | H04W 72/21 |
| 2016/0094996 A1 | 3/2016 | Xiong et al. | |
| 2019/0335485 A1 | 10/2019 | Kundu et al. | |
| 2020/0053761 A1 | 2/2020 | Hosseini et al. | |
| 2020/0154467 A1 | 5/2020 | Gong et al. | |
| 2020/0228173 A1 | 7/2020 | Ye et al. | |
| 2020/0296716 A1 | 9/2020 | Lin et al. | |
| 2020/0314900 A1 | 10/2020 | Hosseini et al. | |
| 2022/0078768 A1* | 3/2022 | El Hamss | H04L 5/0055 |
| 2023/0231662 A1 | 7/2023 | Gou et al. | |

FOREIGN PATENT DOCUMENTS

| | | |
|---|---|---|
| CN | 110225587 A | 9/2019 |
| CN | 110351057 A | 10/2019 |
| CN | 110536464 A | 12/2019 |
| CN | 110708146 A | 1/2020 |
| CN | 111278143 A | 6/2020 |
| CN | 111543021 A | 8/2020 |
| CN | 111565092 A | 8/2020 |
| CN | 111684748 A | 9/2020 |
| CN | 111756493 A | 10/2020 |
| WO | 2018/174450 A1 | 9/2018 |
| WO | 2019/098697 A1 | 5/2019 |
| WO | 2020031918 A1 | 2/2020 |
| WO | 2022077413 A1 | 4/2022 |

OTHER PUBLICATIONS

CNIPA, First Office Action for Chinese Application No. 202080106058.8, mailed on Oct. 16, 2024, 11 pages with unofficial English translation.

CNIPA, Notification to Complete Formalities of Registration for Chinese Application No. 202080106426.9, mailed on Jan. 3, 2025, 6 pages with unofficial English translation.

Asia Pacific Telecom, "UCI enhancements for NR URLLC," 3GPP TSG-RAN WG1 Meeting #98, Prague, Czech Republic, R1-1908931, Aug. 26-30, 2019, 3 pages.

Vivo, "Discussion on short PUCCH for eMBB," 3GPP TSG RAN WG1 #93, Busan, Korea, R1-1806060, May 21-25, 2018, 6 pages.

Wang, "Key Technologies for the Coexistence of Cellular and Wi-Fi Systems," Southeast University School of Information Science and Engineering, May 2019, 355 pages with English translation.

International Search Report and Written Opinion for International Application No. PCT/CN2020/122327, mailed on Jul. 12, 2021. 7 pages.

European Search Report for EP Application No. 20958056.2, dated Sep. 18, 2023, 9 pages.

ZTE, "Discussion on enhanced intra-UE multiplexing," 3GPP TSG RAN WG1 #102-e, R1-2005434, e-Meeting, Aug. 17-28, 2020, 6 pages.

Moderator (OPPO), "Summary#1 on Intra-UE Multiplexing/Prioritization for R17," 3GPP TSG RAN WG1 #102-e, R1-2007055, e-Meeting, Aug. 17-28, 2020, 13 pages.

Moderator (Nokia), "Feature lead summary #4 on HARQ-ACK feedback enhancements for NR Rel-17 URLLC/IIoT (AI 8.3.1.1)," 3GPP TSG-RAN WG1 Meeting #102-e, R1-2007354, e-Meeting, Aug. 17-28, 2020, 141 pages.

International Preliminary Report on Patentability issued in International Patent Application No. PCT/CN2020/122327, dated Apr. 13, 2023, 5 pages.

European Search Report for EP Application No. 20957191.8, dated Oct. 13, 2023, 8 pages.

ZTE, "Mechanisms to Improve Reliability for RRC_Connected UEs," 3GPP TSG RAN WG1 #102-e, e-Meeting, R1-2005437, Aug. 17-28, 2020, 8 pages.

International Search Report and Written Opinion for International Patent Application No. PCT/CN2020/121376, dated Jul. 15, 2021, 9 pages.

Nokia et al., "Work Plan for Rel-17 NR IIoT/URLLC Enhancements WI," 3GPP TSG RAN WG1 Meeting #102-e, e-Meeting, Aug. 17-28, 2020, R1-2006338, 7 pages.

Moderator (OPPO), "Summary #1 on Intra-UE Multiplexing/Prioritization for R17," 3GPP TSG RAN WG1 #102-e e-Meeting, Aug. 17-28, 2020, R1-2007055, 13 pages.

Communication pursuant to Article 94(3) EPC fom EP Application No. 20958056.2, dated May 2, 2025, 4 pages.

* cited by examiner

MULTIPLEXING TECHNIQUES FOR OVERLAPPING CHANNELS WITH DIFFERENT PRIORITIES

CROSS-REFERENCE TO RELATED APPLICATIONS

This application is a continuation of International Patent Application No. PCT/CN2020/122327, filed on Oct. 21, 2020, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for multiplexing content that overlaps in time domain between at least two channels, such as a high priority channel message overlapping with a low priority channel message in time domain. The example techniques described in this patent document can be performed without affecting the delay and reliability of high priority services.

A first example wireless communication method comprises, performing a first determination, by a communication node, that a high priority feedback message to be transmitted on a control channel overlaps in time domain with a low priority feedback message to be transmitted on the control channel; performing a second determination, by the communication node, whether a multiplexing operation between the high priority feedback message and the low priority feedback message is allowed; and transmitting, in response to the first determination and in response to determining that the multiplexing operation is allowed, a multiplexed information in a resource in the control channel, where the multiplexed information comprises the high priority feedback message multiplexed with the low priority feedback message, and where the resource is selected based on a resource indicator indicated by a control information that schedules a shared channel corresponding to the high priority feedback message on the control channel.

In some embodiments, the method further comprises transmitting, in response to the first determination and in response to determining that the multiplexing operation is not allowed, only the high priority feedback message in the resource in the control channel. In some embodiments, the high priority feedback message includes a high priority hybrid automatic repeat request acknowledgement (HARQ-ACK) message, and the low priority feedback message includes a low priority hybrid automatic repeat request acknowledgement (HARQ-ACK) message. In some embodiments, the control channel includes a physical uplink control channel (PUCCH), the shared channel includes a physical uplink shared channel (PUSCH), the control information includes a downlink control information (DCI), and the resource indicator associated with the control channel includes a PUCCH resource indicator (PRI).

A second example wireless communication method comprises, performing a first determination, by a communication node, that a high priority feedback message to be transmitted on a control channel overlaps in time domain with a low priority feedback message to be transmitted on the control channel; includes performing a second determination, by the communication node, that each of the high priority feedback message and the low priority feedback message is less than or equal to two bits; and transmitting, in response to the first determination and the second determination, a sequence comprising multiplexed information, where the multiplexed information comprises the high priority feedback message multiplexed with the low priority feedback message, where the sequence is transmitted in a resource in the control channel, and where the sequence is selected based on a first set of one or more bits of the high priority feedback message and based on a second set of one or more bits of the low priority feedback message.

In some embodiments, the resource is selected based on values of the low priority feedback message and the high priority feedback message. In some embodiments, the resource is configured for transmission of the low priority feedback message on the control channel. In some embodiments, the resource is configured for transmission of the high priority feedback message on the control channel. In some embodiments, the high priority feedback message includes a high priority hybrid automatic repeat request acknowledgement (HARQ-ACK) message, and the low priority feedback message includes a low priority hybrid automatic repeat request acknowledgement (HARQ-ACK) message. In some embodiments, the control channel includes a physical uplink control channel (PUCCH).

A third example wireless communication method comprises, performing a first determination, by a communication node, that a high priority feedback message to be transmitted on a control channel overlaps in time domain with a low priority feedback message to be transmitted on the control channel; performing a second determination, by the communication node, that a multiplexing operation between the high priority feedback message and the low priority feedback message is allowed; and performing, in response to the first determination and the second determination, a codebook based transmission in which a data is constructed using a codebook and multiplexed information and in which the data is transmitted in the control channel, where the multiplexed information comprises the high priority feedback message multiplexed with the low priority feedback message.

In some embodiments, the codebook is a dynamic codebook, and the data is constructed using a continuous downlink assignment index (DAI) value between a high priority downlink control information (DCI) associated with the high priority feedback message and a low priority DCI associated with the low priority feedback message. In some embodiments, the codebook is a semi-static codebook, and the data is constructed according to a set of physical downlink shared channel (PDSCH) receiving occasions corresponding to the high priority feedback message and the low priority feedback message. In some embodiments, the second determination is performed based on a multiplexing indicator that indicates that the multiplexing operation is allowed. In some embodiments, the multiplexing indicator is indicated to the communication node via a downlink control information (DCI) or a radio resource control (RRC) information. In some embodiments, the control channel includes a physical uplink control channel (PUCCH).

A fourth example wireless communication method comprises, performing a first determination, by a communication node, that a first resource for a high priority scheduling request (SR) message to be transmitted on a control channel overlaps in time domain with a second resource for a low priority feedback message to be transmitted on the control channel; performing a second determination, by the communication node, whether a multiplexing operation between the high priority SR message and the low priority feedback message is allowed; and transmitting, in response to the first determination and in response to determining that the multiplexing operation is allowed, a sequence comprising multiplexed information in a resource in the control channel, where the multiplexed information comprises the high priority SR message multiplexed with the low priority feedback message, where the sequence is selected based on the high priority SR message indicating a request for transmission and based on one or more bits of the low priority feedback message, and where the resource is configured for transmission of the high priority SR message.

In some embodiments, the method further comprises transmitting the low priority feedback message on the control channel in response to the high priority SR message indicating that resources are not needed for transmission. In some embodiments, the low priority feedback message includes a low priority hybrid automatic repeat request acknowledgement (HARQ-ACK) message. In some embodiments, the control channel includes a physical uplink control channel (PUCCH).

A fifth example wireless communication method comprises, performing a first determination, by a communication node, that a high priority feedback message to be transmitted on a control channel overlaps in time domain with a message to be transmitted on a low priority shared channel; performing a second determination, by the communication node, whether a multiplexing operation between the high priority feedback message and the message is allowed; and transmitting, in response to the first determination and in response to determining that the multiplexing operation is allowed, a multiplexed information in the low priority shared channel, where the multiplexed information comprises the high priority feedback message multiplexed with the message, and where a modulation symbol of the high priority feedback message is mapped to time-frequency resources that are located after those of a first demodulation reference signal (DMRS) on the low priority shared channel.

In some embodiments, the second determination is performed based on a multiplexing indicator that indicates that the multiplexing operation is allowed. In some embodiments, the multiplexing indicator is indicated to the communication node via a downlink control information (DCI) or a radio resource control (RRC) information. In some embodiments, the method further comprises transmitting, in response to the first determination and in response to determining that the multiplexing operation is not allowed, only the high priority feedback message. In some embodiments, the high priority feedback message includes a high priority hybrid automatic repeat request acknowledgement (HARQ-ACK) message. In some embodiments, the control channel includes a physical uplink control channel (PUCCH), and the low priority shared channel includes a low priority physical uplink shared channel (PUSCH).

A sixth example wireless communication method comprises, performing a first determination, by a communication node, that a high priority feedback message to be transmitted on a control channel overlaps in time domain with a low priority feedback message to be transmitted on the control channel; obtaining a first set of multiplexed information by multiplexing the high priority feedback message and the low priority feedback message based on a first indicator that indicate that a first multiplexing operation between the high priority feedback message and the low priority feedback message is allowed; performing a second determination, by the communication node, that the first set of multiplexed information overlaps in time domain with a message; obtaining, in response to the second determination, a second set of multiplexed information by multiplexing the first set of multiplexed information with the message; and transmitting the second set of multiplexed information on a resource in the control channel.

In some embodiments, the message comprises a high priority scheduling request (SR) message to be transmitted on the control channel. In some embodiments, the resource is selected based on a resource indicator indicated by a control information that schedules the high priority feedback message on the control channel. In some embodiments, the message is to be transmitted on a high priority physical uplink shared channel (PUSCH). In some embodiments, the message is to be transmitted on a low priority physical uplink shared channel (PUSCH). In some embodiments, the control channel includes a physical uplink control channel (PUCCH).

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
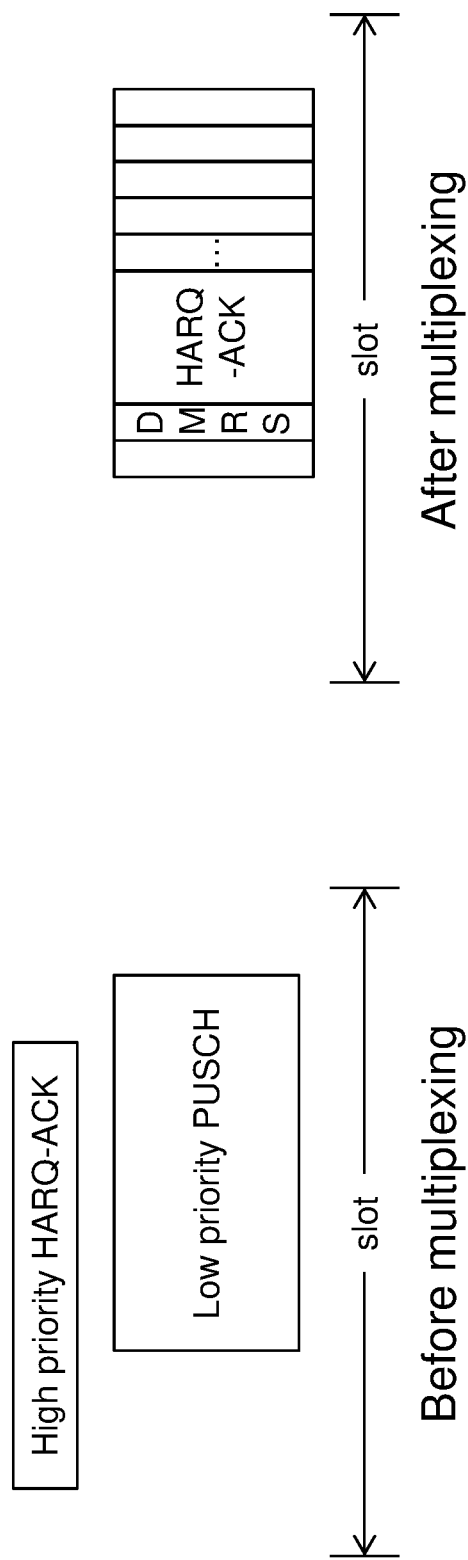
FIG. 1 shows a multiplexing between high priority hybrid automatic repeat request acknowledgement (HARQ-ACK) and low priority physical uplink shared channel (PUSCH).

Generally, the uplink channel can carry ultra-reliable low-latency communication (URLLC) or enhanced mobile broadband (eMBB) services. Compared with the URLLC service, the eMBB service has lower requirements for delay and reliability than the URLLC service. Therefore, the eMBB service has a lower priority while the URLLC service has a high priority in a physical (PHY) layer. During the transmission of uplink information, multiple types of uplink channel carrying control information or data information may be overlapping in the time domain. For different information with same priority carried on overlapping channels, the UE multiplex the overlapping information in accordance with an agreed rule, and then use the existing or new channel resources to transmit the multiplexed information. If the uplink resources of the eMBB service overlap with those of the URLLC service in the time domain, these two types of services with different priorities should also be multiplexed, but the delay and reliability of the URLLC service should not be affected after multiplexing.

In the current technology, the overlapping between high priority channel and low priority channel is implemented by dropping the low priority channels and transmitting the high priority channels only. While this mechanism can ensure the quality of high priority services, such a mechanism degrades performance of low priority services. For example, a physical uplink control channel (PUCCH) resource carrying URLLC hybrid automatic repeat request acknowledgment (HARQ-ACK) and a PUCCH resource carrying eMBB scheduling request (SR) overlap in the time domain. The current solution is to transmit the URLLC HARQ-ACK and drop the eMBB SR. However, this method will make the gNB fail to receive the resource scheduling request indication of eMBB service from the UE, and thus fail to allocate the corresponding time-frequency resources to the UE timely, which seriously affects the quality of the eMBB service. The example methods described in this patent document can include multiplexing the HARQ-ACK of URLLC and the SR of eMBB without affecting the HARQ-ACK delay and reliability if some conditions are met, and then transmit them to the gNB together. After correct demodulation, the gNB can obtain the HARQ-ACK information of the URLLC service and the SR information of the eMBB service.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Embodiment 1: Overlapping Between High Priority HARQ-ACK and Low Priority HARQ-ACK The gNB indicates to a UE whether the high priority HARQ-ACK can be multiplexed with the low priority channel by (1) a new multiplexing indicator field in downlink control information (DCI) that schedule the PDSCH corresponding to the high priority HARQ-ACK or (2) higher layer signaling, e.g., RRC parameter, in PUCCH resource.

If DCI or higher layer signaling indicates to the UE that high priority HARQ-ACK cannot be multiplexed with low priority channels, the low priority HARQ-ACK will be dropped by the UE and only high priority HARQ-ACK will be transmitted by the UE.

If DCI or higher layer signaling indicates to the UE that a high priority HARQ-ACK can be multiplexed with a low priority channel, if the multiplexing timeline are met (e.g., if a time between the first HARQ ACK and the PDCCH that scheduled the PDSCH corresponding to the HARQ-ACK is greater than or equal to a threshold value to enable sufficient time for a multiplexing operation), the UE multiplexes these two HARQ-ACK by one of the following schemes:

Scheme 1

The UE concatenate the bits of the high priority HARQ-ACK codebook and low priority HARQ-ACK codebook, and select the corresponding PUCCH resource set according to the number of bits after concatenation. Then, the UE select a PUCCH resource for transmission based on the concatenated bit(s) from the PUCCH resource set according to the PUCCH resource indicator (PRI) field in the last DCI that schedules a PDSCH corresponding to the high priority HARQ-ACK transmission.

Beneficial effect: In this method, multiplexed information is always transmitted on high priority PUCCH resources, which will ensure the reliability of high priority services.

Scheme 2

If the PUCCH resource carrying high priority HARQ-ACK contain PUCCH format 0 and the PUCCH resource carrying low priority HARQ-ACK contain PUCCH format 0 also, the combination of different bit values of the high priority and low priority HARQ-ACK can be represented by the UE's transmission of different sequences of the high priority PUCCH format 0. Alternatively, the combination of different bit values between the high priority and the low priority HARQ-ACK can be transmitted by the UE on different PUCCH resources combined with different sequences to implement multiplexing. These different sequences are realized by setting different cyclic shifts $m_{CS}$ values. For example:

When both the high priority HARQ-ACK and low priority HARQ-ACK levels are 1 bit,
  The multiplexed information is always transmitted on high priority PUCCH resources using a sequence corresponding to a specific cyclic shift $m_{CS}$. The value of $m_{CS}$ is as follows:
    If high priority HARQ-ACK=0 and low priority HARQ-ACK=0, then $m_{CS}$=0.
    If high priority HARQ-ACK=0 and low priority HARQ-ACK=1, then $m_{CS}$=3.
    If high priority HARQ-ACK=1 and low priority HARQ-ACK=0, then $m_{CS}$=9.
    If high priority HARQ-ACK=1 and low priority HARQ-ACK=1, then $m_{CS}$=6.
  Or, different bit values of high priority HARQ-ACK and low priority HARQ-ACK are transmitted on different PUCCH resources, as follows two modes:
  Mode 1:
    If high priority HARQ-ACK=0 and low priority HARQ-ACK=0, then $m_{CS}$=0, and the multiplexed information will be transmitted on the high priority PUCCH resources.
    If high priority HARQ-ACK=0 and low priority HARQ-ACK=1, then $m_{CS}$=0, and the multiplexed information will be transmitted on the low priority PUCCH resources.
    If high priority HARQ-ACK=1 and low priority HARQ-ACK=1, then $m_{CS}$=6, and the multiplexed information will be transmitted on the low priority PUCCH resources.

If high priority HARQ-ACK=1 and low priority HARQ-ACK=0, then $m_{CS}$=6, and the multiplexed information will be transmitted on the high priority PUCCH resources.

Beneficial effect: this arrangement can eliminate the influence of low priority PDCCH missed detection by UE.

Mode 2:

If high priority HARQ-ACK=0 and low priority HARQ-ACK=0, then $m_{CS}$=0, and the multiplexed information will be transmitted on the high priority PUCCH resources.

If high priority HARQ-ACK=0 and low priority HARQ-ACK=1, then $m_{CS}$=6, and the multiplexed information will be transmitted on the high priority PUCCH resources.

If high priority HARQ-ACK=1 and low priority HARQ-ACK=0, then $m_{CS}$=0, and the multiplexed information will be transmitted on the low priority PUCCH resources.

If high priority HARQ-ACK=1 and low priority HARQ-ACK=1, then $m_{CS}$=6, and the multiplexed information will be transmitted on the low priority PUCCH resources.

Beneficial effect: this arrangement can ensure that the gNB can accurately know the feedback status of high priority NACK from UE.

When the high priority HARQ-ACK is 1 bit, and the low priority HARQ-ACK is 2 bits, The multiplexed information is always transmitted on high priority PUCCH resources using a specific cyclic shift $m_{CS}$. The value of the $m_{CS}$ is as follows:

If high priority HARQ-ACK=0 and low priority HARQ-ACK={0, 0}, then $m_{CS}$=0.

If high priority HARQ-ACK=0 and low priority HARQ-ACK={0, 1}, then $m_{CS}$=1.

If high priority HARQ-ACK=0 and low priority HARQ-ACK={1, 0}, then $m_{CS}$=2.

If high priority HARQ-ACK=0 and low priority HARQ-ACK={1, 1}, then $m_{CS}$=4.

If high priority HARQ-ACK=1 and low priority HARQ-ACK={0, 0}, then $m_{CS}$=6.

If high priority HARQ-ACK=1 and low priority HARQ-ACK={0, 1}, then $m_{CS}$=7.

If high priority HARQ-ACK=1 and low priority HARQ-ACK={1, 0}, then $m_{CS}$=9.

If high priority HARQ-ACK=1 and low priority HARQ-ACK={1, 1}, then $m_{CS}$=11.

Or, different bit values of high priority HARQ-ACK and low priority HARQ-ACK are transmitted on different PUCCH resources, as follows:

If high priority HARQ-ACK=0 and low priority HARQ-ACK={0, 0}, then $m_{CS}$=0, and the multiplexed information will be transmitted on the high priority PUCCH resources.

If high priority HARQ-ACK=0 and low priority HARQ-ACK={0, 1}, then $m_{CS}$=3, and the multiplexed information will be transmitted on the high priority PUCCH resources.

If high priority HARQ-ACK=0 and low priority HARQ-ACK={1, 0}, then $m_{CS}$=9, and the multiplexed information will be transmitted on the high priority PUCCH resources.

If high priority HARQ-ACK=0 and low priority HARQ-ACK={1, 1}, then $m_{CS}$=6, and the multiplexed information will be transmitted on the high priority PUCCH resources.

If high priority HARQ-ACK=1 and low priority HARQ-ACK={0, 0}, then $m_{CS}$=0, and the multiplexed information will be transmitted on the low priority PUCCH resources.

If high priority HARQ-ACK=1 and low priority HARQ-ACK={0, 1}, then $m_{CS}$=3, and the multiplexed information will be transmitted on the low priority PUCCH resources.

If high priority HARQ-ACK=1 and low priority HARQ-ACK={1, 0}, then $m_{CS}$=9, and the multiplexed information will be transmitted on the low priority PUCCH resources.

If high priority HARQ-ACK=1 and low priority HARQ-ACK={1, 1}, then $m_{CS}$=6, and the multiplexed information will be transmitted on the low priority PUCCH resources.

When the high priority HARQ-ACK is 2 bits and the low priority HARQ-ACK is 1 bit, The multiplexed information is always transmitted on high priority PUCCH resources using a specific cyclic shift $m_{CS}$. The value of the $m_{CS}$ is as follows:

If high priority HARQ-ACK={0, 0} and low priority HARQ-ACK=0, then $m_{CS}$=0.

If high priority HARQ-ACK={0, 0} and low priority HARQ-ACK=1, then $m_{CS}$=1.

If high priority HARQ-ACK={0, 1} and low priority HARQ-ACK=0, then $m_{CS}$=3.

If high priority HARQ-ACK={0, 1} and low priority HARQ-ACK=1, then $m_{CS}$=4.

If high priority HARQ-ACK={1, 0} and low priority HARQ-ACK=0, then $m_{CS}$=7.

If high priority HARQ-ACK={1, 0} and low priority HARQ-ACK=1, then $m_{CS}$=9.

If high priority HARQ-ACK={1, 1} and low priority HARQ-ACK=0, then $m_{CS}$=10.

If high priority HARQ-ACK={1, 1} and low priority HARQ-ACK=1, then $m_{CS}$=6.

Or, different bit values of high priority HARQ-ACK and low priority HARQ-ACK are transmitted on different PUCCH resources, as follows two modes:

Mode 1:

If high priority HARQ-ACK={0, 0} and low priority HARQ-ACK=0, then $m_{CS}$=0, and the multiplexed information will be transmitted on the high priority PUCCH resources.

If high priority HARQ-ACK={0, 0} and low priority HARQ-ACK=1, then $m_{CS}$=0, and the multiplexed information will be transmitted on the low priority PUCCH resources.

If high priority HARQ-ACK={0, 1} and low priority HARQ-ACK=0, then $m_{CS}$=3, and the multiplexed information will be transmitted on the high priority PUCCH resources.

If high priority HARQ-ACK={0, 1} and low priority HARQ-ACK=1, then $m_{CS}$=3, and the multiplexed information will be transmitted on the low priority PUCCH resources.

If high priority HARQ-ACK={1, 0} and low priority HARQ-ACK=0, then $m_{CS}$=9, and the multiplexed information will be transmitted on the high priority PUCCH resources.

If high priority HARQ-ACK={1, 0} and low priority HARQ-ACK=1, then $m_{CS}$=9, and the multiplexed information will be transmitted on the low priority PUCCH resources.

If high priority HARQ-ACK={1, 1} and low priority HARQ-ACK=0, then $m_{CS}$=6, and the multiplexed information will be transmitted on the high priority PUCCH resources.

If high priority HARQ-ACK={1, 1} and low priority HARQ-ACK=1, then $m_{CS}$=6, and the multiplexed information will be transmitted on the low priority PUCCH resources.

Beneficial effect: this arrangement can eliminate the influence of low priority PDCCH missed detection by UE.

Mode 2:

If high priority HARQ-ACK={0, 0} and low priority HARQ-ACK=0, then $m_{CS}$=0, and the multiplexed information will be transmitted on the high priority PUCCH resources.

If high priority HARQ-ACK={0, 0} and low priority HARQ-ACK=1, then $m_{CS}$=3, and the multiplexed information will be transmitted on the high priority PUCCH resources.

If high priority HARQ-ACK={0, 1} and low priority HARQ-ACK=0, then $m_{CS}$=6, and the multiplexed information will be transmitted on the high priority PUCCH resources.

If high priority HARQ-ACK={0, 1} and low priority HARQ-ACK=1, then $m_{CS}$=0, and the multiplexed information will be transmitted on the low priority PUCCH resources.

If high priority HARQ-ACK={1, 0} and low priority HARQ-ACK=0, then $m_{CS}$=9, and the multiplexed information will be transmitted on the high priority PUCCH resources.

If high priority HARQ-ACK={1, 0} and low priority HARQ-ACK=1, then $m_{CS}$=3, and the multiplexed information will be transmitted on the low priority PUCCH resources.

If high priority HARQ-ACK={1, 1} and low priority HARQ-ACK=0, then $m_{CS}$=6, and the multiplexed information will be transmitted on the low priority PUCCH resources.

If high priority HARQ-ACK={1, 1} and low priority HARQ-ACK=1, then $m_{CS}$=9, and the multiplexed information will be transmitted on the low priority PUCCH resources.

Beneficial effect: this arrangement can ensure that the gNB can more accurately know the feedback status of high priority NACK and low priority HARQ-ACK from UE.

When both the high and low priority HARQ-ACK are 2 bits,

The multiplexed information is always transmitted on high priority PUCCH resources using a specific cyclic shift $m_{CS}$. The value of the $m_{CS}$ is as follows:

If high priority HARQ-ACK={0, 0} and low priority HARQ-ACK={0, 0}, then $m_{CS}$=0.

If high priority HARQ-ACK={0, 0} and low priority HARQ-ACK={0, 1}, then $m_{CS}$=1.

If high priority HARQ-ACK={0, 0} and low priority HARQ-ACK={1, 0}, then $m_{CS}$=2.

If high priority HARQ-ACK={0, 0} and low priority HARQ-ACK={1, 1}, then $m_{CS}$=2.

If high priority HARQ-ACK={0, 1} and low priority HARQ-ACK={0, 0}, then $m_{CS}$=3.

If high priority HARQ-ACK={0, 1} and low priority HARQ-ACK={0, 1}, then $m_{CS}$=4.

If high priority HARQ-ACK={0, 1} and low priority HARQ-ACK={1, 0}, then $m_{CS}$=5.

If high priority HARQ-ACK={0, 1} and low priority HARQ-ACK={1, 1}, then $m_{CS}$=5.

If high priority HARQ-ACK={1, 0} and low priority HARQ-ACK={0, 0}, then $m_{CS}$=6.

If high priority HARQ-ACK={1, 0} and low priority HARQ-ACK={0, 1}, then $m_{CS}$=7.

If high priority HARQ-ACK={1, 0} and low priority HARQ-ACK={1, 0}, then $m_{CS}$=8.

If high priority HARQ-ACK={1, 0} and low priority HARQ-ACK={1, 1}, then $m_{CS}$=8.

If high priority HARQ-ACK={1, 1} and low priority HARQ-ACK={0, 0}, then $m_{CS}$=9.

If high priority HARQ-ACK={1, 1} and low priority HARQ-ACK={0, 1}, then $m_{CS}$=10.

If high priority HARQ-ACK={1, 1} and low priority HARQ-ACK={1, 0}, then $m_{CS}$=11.

If high priority HARQ-ACK={1, 1} and low priority HARQ-ACK={1, 1}, then $m_{CS}$=11.

PUCCH format 0 supports a maximum of 12 orthogonal sequences. When both high priority and low priority HARQ-ACK are 2 bits, there are 16 states in total. Therefore, some states need to be combined so that two different states correspond to the same sequence. For example, when the low priority HARQ-ACK is {1, 0} and {1, 1}, these two states correspond to the same $m_{CS}$ value.

Or, different bit values of high priority HARQ-ACK and low priority HARQ-ACK are transmitted on different PUCCH resources, as follows:

If high priority HARQ-ACK={0, 0} and low priority HARQ-ACK={0, 0}, then $m_{CS}$=0, and the multiplexed information will be transmitted on the high priority PUCCH resources.

If high priority HARQ-ACK={0, 0} and low priority HARQ-ACK={0, 1}, then $m_{CS}$=1, and the multiplexed information will be transmitted on the high priority PUCCH resources.

If high priority HARQ-ACK={0, 0} and low priority HARQ-ACK={1, 0}, then $m_{CS}$=2, and the multiplexed information will be transmitted on the high priority PUCCH resources.

If high priority HARQ-ACK={0, 0} and low priority HARQ-ACK={1, 1}, then $m_{CS}$=3, and the multiplexed information will be transmitted on the high priority PUCCH resources.

If high priority HARQ-ACK={0, 1} and low priority HARQ-ACK={0, 0}, then $m_{CS}$=4, and the multiplexed information will be transmitted on the high priority PUCCH resources.

If high priority HARQ-ACK={0, 1} and low priority HARQ-ACK={0, 1}, then $m_{CS}$=5, and the multiplexed information will be transmitted on the PUCCH resources with high priority.

If high priority HARQ-ACK={0, 1} and low priority HARQ-ACK={1, 0}, then $m_{CS}$=6, and the multiplexed information will be transmitted on the high priority PUCCH resources.

If high priority HARQ-ACK={0, 1} and low priority HARQ-ACK={1, 1}, then $m_{CS}$=7, and the multiplexed information will be transmitted on the high priority PUCCH resources.

If high priority HARQ-ACK={1, 0} and low priority HARQ-ACK={0, 0}, then $m_{CS}$=8, and the multiplexed information will be transmitted on the high priority PUCCH resources.

If high priority HARQ-ACK={1, 0} and low priority HARQ-ACK={0, 1}, then $m_{CS}$=9, and the multiplexed information will be transmitted on the high priority PUCCH resources.

If high priority HARQ-ACK={1, 0} and low priority HARQ-ACK={1, 0}, then $m_{CS}$=10, and the multiplexed information will be transmitted on the high priority PUCCH resources.

If high priority HARQ-ACK={1, 0}, and low priority HARQ-ACK={1, 1}, then $m_{CS}$=11, and the multiplexed information will be transmitted on the high priority PUCCH resources.

If high priority HARQ-ACK={1, 1}, and low priority HARQ-ACK={0, 0}, then $m_{CS}$=0, and the multiplexed information will be transmitted on the low priority PUCCH resources.

If high priority HARQ-ACK={1, 1} and low priority HARQ-ACK={0, 1}, then $m_{CS}$=3, and the multiplexed information will be transmitted on the low priority PUCCH resources.

If high priority HARQ-ACK={1, 1} and low priority HARQ-ACK={1, 0}, then $m_{CS}$=6, and the multiplexed information will be transmitted on the low priority PUCCH resources.

If high priority HARQ-ACK={1, 1} and low priority HARQ-ACK={1, 1}, then $m_{CS}$=9, and the multiplexed information will be transmitted on the low priority PUCCH resources.

Beneficial effect: this arrangement can ensure that the gNB can more accurately know the feedback status of high priority NACK from UE.

If the PUCCH resource carrying high priority HARQ-ACK contain PUCCH format 0 and the PUCCH resource carrying low priority HARQ-ACK contain PUCCH format 1, the combination of different bit values of the high priority and low priority HARQ-ACK can be represented by the UE's transmission of different sequences of the high priority PUCCH format 0. Alternatively, the combination of different bit values between the high priority HARQ-ACK and low priority HARQ-ACK can be transmitted by the UE on different PUCCH resources combined with different sequences or bits to achieve multiplexing. For example:

When both the high and low HARQ-ACK levels are 1 bit,

The multiplexed information is always transmitted on high priority PUCCH resources using a specific cyclic shift $m_{CS}$. The value of the $m_{CS}$ is as follows:

If high priority HARQ-ACK=0 and low priority HARQ-ACK=0, then $m_{CS}$=0.

If high priority HARQ-ACK=0 and low priority HARQ-ACK=1, then $m_{CS}$=3.

If high priority HARQ-ACK=1 and low priority HARQ-ACK=0, then $m_{CS}$=9.

If high priority HARQ-ACK=1 and low priority HARQ-ACK=1, then $m_{CS}$=6.

Or, transmitted the multiplexed information on different PUCCH resources, as follows 2 modes:

Mode 1:

If high priority HARQ-ACK=0 and low priority HARQ-ACK=0, then the multiplexed information will be transmitted on the high priority PUCCH resources, and $m_{CS}$=0;

If high priority HARQ-ACK=0 and low priority HARQ-ACK=1, then the multiplexed information will be transmitted on the low priority PUCCH resources, and the bits before modulation is b(0)=1.

If high priority HARQ-ACK=1 and low priority HARQ-ACK=0, then the multiplexed information will be transmitted on the high priority PUCCH resources, and $m_{CS}$=6.

If high priority HARQ-ACK=1 and low priority HARQ-ACK=1, then the multiplexed information will be transmitted on the low priority PUCCH resources, and the bits before modulation is b(0)=0.

Beneficial effect: this arrangement can eliminate the influence of low priority PDCCH missed detection by UE.

Mode 2

If high priority HARQ-ACK=0 and low priority HARQ-ACK=0, then the multiplexed information will be transmitted on the high priority PUCCH resources, and $m_{CS}$=0.

If high priority HARQ-ACK=0 and low priority HARQ-ACK=1, then the multiplexed information will be transmitted on the high priority PUCCH resources, and $m_{CS}$=6.

If high priority HARQ-ACK=1 and low priority HARQ-ACK=0, then the multiplexed information will be transmitted on the low priority PUCCH resources, and the bits before modulation is b(0)=0.

If high priority HARQ-ACK=1 and low priority HARQ-ACK=1, then the multiplexed information will be transmitted on the low priority PUCCH resources, and the bits before modulation is b(0)=1.

Beneficial effect: this arrangement can ensure that the gNB can more accurately know the feedback status of high priority high priority NACK from UE.

When the high priority HARQ-ACK is 1 bit, and the low priority HARQ-ACK is 2 bits, The multiplexed information is always transmitted on high priority PUCCH resources using a specific cyclic shift $m_{CS}$. The value of the $m_{CS}$ is as follows:

If high priority HARQ-ACK=0 and low priority HARQ-ACK={0, 0}, then $m_{CS}$=0.

If high priority HARQ-ACK=0 and low priority HARQ-ACK={0, 1}, then $m_{CS}$=1.

If high priority HARQ-ACK=0 and low priority HARQ-ACK={1, 0}, then $m_{CS}$=2.

If high priority HARQ-ACK=0 and low priority HARQ-ACK={1, 1}, then $m_{CS}$=4.

If high priority HARQ-ACK=1 and low priority HARQ-ACK={0, 0}, then $m_{CS}$=6.

If high priority HARQ-ACK=1 and low priority HARQ-ACK={0, 1}, then $m_{CS}$=7.

If high priority HARQ-ACK=1 and low priority HARQ-ACK={1, 0}, then $m_{CS}$=9.

If high priority HARQ-ACK=1 and low priority HARQ-ACK={1, 1}, then $m_{CS}$=11.

Or, transmitted the multiplexed information on different PUCCH resources, as follows:

If high priority HARQ-ACK=0 and low priority HARQ-ACK={0, 0}, the multiplexed information will be transmitted on the high priority PUCCH resources, and $m_{CS}$=0.

If high priority HARQ-ACK=0 and low priority HARQ-ACK={0, 1}, the multiplexed information will be transmitted on the high priority PUCCH resources, and $m_{CS}$=3.

If high priority HARQ-ACK=0 and low priority HARQ-ACK={1, 0}, the multiplexed information will be transmitted on the high priority PUCCH resources, and $m_{CS}$=9.

If high priority HARQ-ACK=0 and low priority HARQ-ACK={1, 1}, the multiplexed information will be transmitted on the high priority PUCCH resources, and $m_{CS}$=6.

If high priority HARQ-ACK=1 and low priority HARQ-ACK={0, 0}, the multiplexed information will be transmitted on the low priority PUCCH resources, and the bits before modulation is b(0)={0, 0}.

If high priority HARQ-ACK=1 and low priority HARQ-ACK={0, 1}, the multiplexed information will be transmitted on the low priority PUCCH resources, and the bits before modulation is b(0)={0, 1}.

If high priority HARQ-ACK=1 and low priority HARQ-ACK={1, 0}, the multiplexed information will be transmitted on the low priority PUCCH resources, and the bits before modulation is b(0)={1, 0}.

If high priority HARQ-ACK=1 the low priority HARQ-ACK={1, 1}, the multiplexed information will be transmitted on the low priority PUCCH resources, and the bits before modulation is b(0)={1, 1}.

Beneficial effect: this arrangement can ensure that the gNB can more accurately know the feedback status of high priority NACK from UE.

When the high priority HARQ-ACK is 2 bits and the low priority HARQ-ACK is 1 bits, The multiplexed information is always transmitted on high priority PUCCH resources using a specific cyclic shift $m_{CS}$. The value of the $m_{CS}$ is as follows:

If high priority HARQ-ACK={0, 0} and low priority HARQ-ACK=0, then $m_{CS}$=0.

If high priority HARQ-ACK={0, 0} and low priority HARQ-ACK=1, then $m_{CS}$=1.

If high priority HARQ-ACK={0, 1} and low priority HARQ-ACK=0, then $m_{CS}$=3.

If high priority HARQ-ACK={0, 1} and low priority HARQ-ACK=1, then $m_{CS}$=4.

If high priority HARQ-ACK={1, 0} and low priority HARQ-ACK=0, then $m_{CS}$=7.

If high priority HARQ-ACK={1, 0} and low priority HARQ-ACK=1, then $m_{CS}$=9.

If high priority HARQ-ACK={1, 1} and low priority HARQ-ACK=0, then $m_{CS}$=10.

If high priority HARQ-ACK={1, 1} and low priority HARQ-ACK=1, then $m_{CS}$=6.

Or, transmitted the multiplexed information on different PUCCH resources, as follows two modes:

Mode 1:
If high priority HARQ-ACK={0, 0} and low priority HARQ-ACK=0, the multiplexed information will be transmitted on the high priority PUCCH resources, and $m_{CS}$=0.

If high priority HARQ-ACK={0, 0} and low priority HARQ-ACK=1, the multiplexed information will be transmitted on the low priority PUCCH resources, and the bits before modulation is b(0)={0, 0}.

If high priority HARQ-ACK={0, 1} the low priority HARQ-ACK=0, the multiplexed information will be transmitted on the high priority PUCCH resources, and $m_{CS}$=3.

If high priority HARQ-ACK={0, 1} and low priority HARQ-ACK=1, the multiplexed information will be transmitted on the low priority PUCCH resources, and the bits before modulation is b(0)={0, 1}.

If high priority HARQ-ACK={1, 0} and low priority HARQ-ACK=0, the multiplexed information will be transmitted on the high priority PUCCH resources, and $m_{CS}$=9.

If high priority HARQ-ACK={1, 0} and low priority HARQ-ACK=1, the multiplexed information will be transmitted on the low priority PUCCH resources, and the bits before modulation is b(0)={1, 0}.

If high priority HARQ-ACK={1, 1} and low priority HARQ-ACK=0, the multiplexed information will be transmitted on the high priority PUCCH resources, and $m_{CS}$=6.

If high priority HARQ-ACK={1, 1} and low priority HARQ-ACK=1, the multiplexed information will be transmitted on the low priority PUCCH resources, and the bits before modulation is b(0)={1, 1}.

Beneficial effect: this arrangement can eliminate the influence of low priority PDCCH missed detection by UE.

Mode 2:
If high priority HARQ-ACK={0, 0} and low priority HARQ-ACK=0, the multiplexed information will be transmitted on the high priority PUCCH resources, and $m_{CS}$=0.

If high priority HARQ-ACK={0, 0} and low priority HARQ-ACK=1, the multiplexed information will be transmitted on the high priority PUCCH resources, and $m_{CS}$=3.

If high priority HARQ-ACK={0, 1} the low priority HARQ-ACK=0, the multiplexed information will be transmitted on the high priority PUCCH resources, and $m_{CS}$=6.

If high priority HARQ-ACK={0, 1} and low priority HARQ-ACK=1, the multiplexed information will be transmitted on the low priority PUCCH resources, and the bits before modulation is b(0)={0, 0}.

If high priority HARQ-ACK={1, 0} and low priority HARQ-ACK=0, the multiplexed information will be transmitted on the high priority PUCCH resources, and the $m_{CS}$=9.

If high priority HARQ-ACK={1, 0} and low priority HARQ-ACK=1, the multiplexed information will be transmitted on the low priority PUCCH resources, and the bits before modulation is b(0)={0, 1}.

If high priority HARQ-ACK={1, 1} and low priority HARQ-ACK=0, the multiplexed information will be transmitted on the low priority PUCCH resources, and the bits before modulation is b(0)={1, 0}.

If high priority HARQ-ACK={1, 1} and low priority HARQ-ACK=1, the multiplexed information will be transmitted on the low priority PUCCH resources, and the bits before modulation is b(0)={1, 1}.

Beneficial effect: this arrangement can ensure that the gNB can more accurately know the feedback status of high priority NACK and low priority NACK from UE.

When both the high and low priority HARQ-ACK are 2 bits,

It is always transmitted on high priority PUCCH resources using a specific cyclic shift $m_{CS}$. The value of the $m_{CS}$ is as follows:

If high priority HARQ-ACK={0, 0} and low priority HARQ-ACK={0, 0}, then $m_{CS}$=0.
If high priority HARQ-ACK={0, 0} and low priority HARQ-ACK={0, 1}, then $m_{CS}$=1.
If high priority HARQ-ACK={0, 0} and low priority HARQ-ACK={1, 0}, then $m_{CS}$=2.
If high priority HARQ-ACK={0, 0} and low priority HARQ-ACK={1, 1}, then $m_{CS}$=2.
If high priority HARQ-ACK={0, 1} and low priority HARQ-ACK={0, 0}, then $m_{CS}$=3.
If high priority HARQ-ACK={0, 1} and low priority HARQ-ACK={0, 1}, then $m_{CS}$=4.
If high priority HARQ-ACK={0, 1} and low priority HARQ-ACK={1, 0}, then $m_{CS}$=5.
If high priority HARQ-ACK={0, 1} and low priority HARQ-ACK={1, 1}, then $m_{CS}$=5.
If high priority HARQ-ACK={1, 0} and low priority HARQ-ACK={0, 0}, then $m_{CS}$=6.
If high priority HARQ-ACK={1, 0} and low priority HARQ-ACK={0, 1}, then $m_{CS}$=7.
If high priority HARQ-ACK={1, 0} and low priority HARQ-ACK={1, 0}, then $m_{CS}$=8.
If high priority HARQ-ACK={1, 0} and low priority HARQ-ACK={1, 1}, then $m_{CS}$=8.
If high priority HARQ-ACK={1, 1} and low priority HARQ-ACK={0, 0}, then $m_{CS}$=9.
If high priority HARQ-ACK={1, 1} and low priority HARQ-ACK={0, 1}, then $m_{CS}$=10.
If high priority HARQ-ACK={1, 1} and low priority HARQ-ACK={1, 0}, then $m_{CS}$=11.
If high priority HARQ-ACK={1, 1} and low priority HARQ-ACK={1, 1}, then $m_{CS}$=11.

PUCCH format 0 supports a maximum of 12 orthogonal sequences. When the high priority HARQ-ACK and low priority HARQ-ACK all are 2 bits, there are 16 states in total. Therefore, some states need to be combined so that two different states correspond to the same sequence. For example, when the low priority HARQ-ACK is {1, 0} and {1, 1}, the two states correspond to the same $m_{CS}$ value.

Or, transmitted the multiplexed information on different PUCCH resources, as follows:

If high priority HARQ-ACK={0, 0} and low priority HARQ-ACK={0, 0}, the multiplexed information will be transmitted on the high priority PUCCH resources, and $m_{CS}$=0.
If high priority HARQ-ACK={0, 0} and low priority HARQ-ACK={0, 1}, the multiplexed information will be transmitted on the high priority PUCCH resources, and $m_{CS}$=1.
If high priority HARQ-ACK={0, 0} and low priority HARQ-ACK={1, 0}, the multiplexed information will be transmitted on the high priority PUCCH resources, and $m_{CS}$=2.
If high priority HARQ-ACK={0, 0} and low priority HARQ-ACK={1, 1}, the multiplexed information will be transmitted on the high priority PUCCH resources, and $m_{CS}$=3.
If high priority HARQ-ACK={0, 1} and low priority HARQ-ACK={0, 0}, the multiplexed information will be transmitted on the high priority PUCCH resources, and $m_{CS}$=4.
If high priority HARQ-ACK={0, 1} and low priority HARQ-ACK={0, 1}, the multiplexed information will be transmitted on the high priority PUCCH resources, and $m_{CS}$=5.
If high priority HARQ-ACK={0, 1} and low priority HARQ-ACK={1, 0}, the multiplexed information will be transmitted on the high priority PUCCH resources, and $m_{CS}$=6.
If high priority HARQ-ACK={0, 1} and low priority HARQ-ACK={1, 1}, the multiplexed information will be transmitted on the high priority PUCCH resources, and $m_{CS}$=7.
If high priority HARQ-ACK={1, 0} and low priority HARQ-ACK={0, 0}, the multiplexed information will be transmitted on the high priority PUCCH resources, and $m_{CS}$=8.
If high priority HARQ-ACK={1, 0} and low priority HARQ-ACK={0, 1}, the multiplexed information will be transmitted on the high priority PUCCH resources, and $m_{CS}$=9.
If high priority HARQ-ACK={1, 0} and low priority HARQ-ACK={1, 0}, the multiplexed information will be transmitted on the high priority PUCCH resources, and $m_{CS}$=10.
If high priority HARQ-ACK={1, 0} and low priority HARQ-ACK={1, 1}, the multiplexed information will be transmitted on the high priority PUCCH resources, and $m_{CS}$=11.
If high priority HARQ-ACK={1, 1}, and low priority HARQ-ACK={0, 0}, the multiplexed information will be transmitted on the low priority PUCCH resources, and the bits before modulation is b(0)={0, 0}.
If high priority HARQ-ACK={1, 1} and low priority HARQ-ACK={0, 1}, the multiplexed information will be transmitted on the low priority PUCCH resource, and the bits before modulation is b(0)={0, 1}.
If high priority HARQ-ACK={1, 1} and low priority HARQ-ACK={1, 0}, the multiplexed information will be transmitted on the low priority PUCCH resources, and the bits before modulation is b(0)={1, 0}.
If high priority HARQ-ACK={1, 1} and low priority HARQ-ACK={1, 1}, the multiplexed information will be transmitted on the low priority PUCCH, and the bits before modulation is b(0)={1, 1}.

Beneficial effect: this arrangement can ensure that the gNB can more accurately know the feedback status of high priority NACK from UE.

If the high priority HARQ-ACK uses PUCCH format 0 for transmission and the low priority HARQ-ACK uses PUCCH format 2, PUCCH format 3 or PUCCH format 4 for transmission, the HARQ-ACK bits of two different priorities are concatenated, and the corresponding PUCCH resource set is selected according to the number of bits after concatenation. Then, a PUCCH resource is selected by the PRI field of the high priority last DCI from the PUCCH resource set to transmit the concatenated bits.

If the high priority HARQ-ACK uses the PUCCH format 1 for transmission and the low priority HARQ-ACK uses the PUCCH format 0 or PUCCH format 1 for transmission, the different bits of the high priority HARQ-ACK PUCCH format 1 carry the high priority HARQ-ACK, and the different sequences of the high priority HARQ-ACK carry the low priority HARQ-ACK. For example, When both the high and low HARQ-ACK levels are 1 bit,
If high priority HARQ-ACK=0 and low priority HARQ-ACK=1, then the bits before modulation on PUCCH format 1 will be b(0)=0 and the cyclic shift will be $m_{CS}$=0.
If high priority HARQ-ACK=0 and low priority HARQ-ACK=1, then the bits before modulation on PUCCH format 1 will be b(0)=0 and the cyclic shift will be $m_{CS}$=6.
If high priority HARQ-ACK=1 and low priority HARQ-ACK=0, then the bits before modulation on PUCCH format 1 should be b(0)=1 and the cyclic shift will be $m_{CS}$=0.
If high priority HARQ-ACK=1 and low priority HARQ-ACK=1, then the bits before modulation on PUCCH format 1 should be b(0)=1 and the cyclic shift will be $m_{CS}$=6.

When the high priority HARQ-ACK is 1 bit, and the low priority HARQ-ACK is 2 bits,
If high priority HARQ-ACK=0 and low priority HARQ-ACK={0, 0}, then the bit before modulation on PUCCH format 1 is b(0)=0 and the cyclic shift will be $m_{CS}$=0.
If high priority HARQ-ACK=0 and low priority HARQ-ACK={0, 1}, then the bit before modulation on PUCCH format 1 is b(0)=0 and the cyclic shift will be $m_{CS}$=3.
If high priority HARQ-ACK=0 and low priority HARQ-ACK={1, 0}, then the bit before modulation on PUCCH format 1 is b(0)=0 and the cyclic shift will be $m_{CS}$=9.
If high priority HARQ-ACK=0 and low priority HARQ-ACK={1, 1}, then the bit before modulation on PUCCH format 1 is b(0)=0 and the cyclic shift will be $m_{CS}$=6.
If high priority HARQ-ACK=1 and low priority HARQ-ACK={0, 0}, then the bit before modulation on PUCCH format 1 is b(0)=1 and the cyclic shift will be $m_{CS}$=0.
If high priority HARQ-ACK=1 and low priority HARQ-ACK={0, 1}, then the bit before modulation on PUCCH format 1 is b(0)=1 and the cyclic shift will be $m_{CS}$=3.
If high priority HARQ-ACK=1 and low priority HARQ-ACK={1, 0}, then the bit before modulation on PUCCH format 1 is b(0)=1 and the cyclic shift will be $m_{CS}$=9.
If high priority HARQ-ACK=1 and low priority HARQ-ACK={1, 1}, then the bit before modulation on PUCCH format 1 is b(0)=1 and the cyclic shift will be $m_{CS}$=6.

When the high priority HARQ-ACK is 2 bits and the low priority HARQ-ACK is 1 bits,
If high priority HARQ-ACK={0, 0} and low priority HARQ-ACK=0, then the bits before modulation on PUCCH format 1 are b(0)={0, 0} and the cyclic shift will be $m_{CS}$=0.
If high priority HARQ-ACK={0, 0} and low priority HARQ-ACK=1, then the bits before modulation on PUCCH format 1 are b(0)={0, 0} and the cyclic shift will be $m_{CS}$=6.
If high priority HARQ-ACK={0, 1} and low priority HARQ-ACK=0, then the bits before modulation on PUCCH format 1 are b(0)={0, 1} and the cyclic shift will be $m_{CS}$=0.
If high priority HARQ-ACK={0, 1} and low priority HARQ-ACK=1, then the bits before modulation on PUCCH format 1 are b(0)={0, 1} and the cyclic shift will be $m_{CS}$=6.
If high priority HARQ-ACK={1, 0} and low priority HARQ-ACK=0, then the bits before modulation on PUCCH format 1 are b(0)={1, 0} and the cyclic shift will be $m_{CS}$=0.
If high priority HARQ-ACK={1, 0} and low priority HARQ-ACK=1, then the bits before modulation on PUCCH format 1 are b(0)={1, 0} and the cyclic shift will be $m_{CS}$=6.
If high priority HARQ-ACK={1, 1} and low priority HARQ-ACK=0, then the bits before modulation on PUCCH format 1 are b(0)={1, 1} and the cyclic shift will be $m_{CS}$=0.
If high priority HARQ-ACK={1, 1} and low priority HARQ-ACK=1, then the bits before modulation on PUCCH format 1 are b(0)={1, 1} and the cyclic shift will be $m_{CS}$=6.

When both the high and low priority HARQ-ACK are 2 bits,
If high priority HARQ-ACK={0, 0} and low priority HARQ-ACK={0, 0}, then the bits before modulation on PUCCH format 1 are b(0)={0, 0}, and the cyclic shift will be $m_{CS}$=0.
If high priority HARQ-ACK={0, 0} and low priority HARQ-ACK={0, 1}, then the bits before modulation on PUCCH format 1 are b(0)={0, 0} and the cyclic shift will be $m_{CS}$=3.
If high priority HARQ-ACK={0, 0} and low priority HARQ-ACK={1, 0}, then the bits before modulation on PUCCH format 1 are b(0)={0, 0} and the cyclic shift will be $m_{CS}$=9.
If high priority HARQ-ACK={0, 0} and low priority HARQ-ACK={1, 1}, then the bits before modulation on PUCCH format 1 are b(0)={0,0} and the cyclic shift will be $m_{CS}$=6.
If high priority HARQ-ACK={0, 1} and low priority HARQ-ACK={0, 0}, then the bits before modulation on PUCCH format 1 are b(0)={0, 1} and the cyclic shift will be $m_{CS}$=0.
If high priority HARQ-ACK={0, 1} and low priority HARQ-ACK={0, 1}, then the bits before modulation on PUCCH format 1 are b(0)={0, 1} and the cyclic shift will be $m_{CS}$=3.
If high priority HARQ-ACK={0, 1} and low priority HARQ-ACK={1, 0}, then the bits before modulation on PUCCH format 1 are b(0)={0, 1} and the cyclic shift will be $m_{CS}$=9.
If high priority HARQ-ACK={0, 1} and low priority HARQ-ACK={1, 1}, then the bits before modulation on PUCCH format 1 are b(0)={0, 1} and the cyclic shift will be $m_{CS}$=6.
If high priority HARQ-ACK={1, 0} and low priority HARQ-ACK={0, 0}, then the bits before modulation on PUCCH format 1 are b(0)={1, 0} and the cyclic shift will be $m_{CS}$=0.
If high priority HARQ-ACK={1, 0} and low priority HARQ-ACK={0, 1}, then the bits before modulation on PUCCH format 1 are b(0)={1, 0} and the cyclic shift will be $m_{CS}$=3.

If high priority HARQ-ACK={1, 0} and low priority HARQ-ACK={1, 0}, then the bits before modulation on PUCCH format 1 are b(0)={1, 0} and the cyclic shift will be $m_{CS}$=9.

If high priority HARQ-ACK={1, 0} and low priority HARQ-ACK={1, 1}, then the bits before modulation on PUCCH format 1 are b(0)={1, 0} and the cyclic shift will be $m_{CS}$=6.

If high priority HARQ-ACK={1, 1} and low priority HARQ-ACK={0, 0}, then the bits before modulation on PUCCH format 1 are b(0)={1, 1} and the cyclic shift will be $m_{CS}$=0.

If high priority HARQ-ACK={1, 1} and low priority HARQ-ACK={0, 1}, then the bits before modulation on PUCCH format 1 are b(0)={1, 1} and the cyclic shift will be $m_{CS}$=3.

If high priority HARQ-ACK={1, 1} and low priority HARQ-ACK={1, 0}, then the bits before modulation on PUCCH format 1 are b(0)={1, 1} and the cyclic shift will be $m_{CS}$=9.

If high priority HARQ-ACK={1, 1} and low priority HARQ-ACK={1, 1}, then the bits before modulation on PUCCH format 1 are b(0)={1, 1} and the cyclic shift will be $m_{CS}$=6.

If the high priority HARQ-ACK uses PUCCH format 1, PUCCH format 2 or PUCCH format 3 for transmission, and the low priority HARQ-ACK uses PUCCH format 2, PUCCH format 3 or PUCCH format 4 for transmission, the HARQ-ACK bits of two different priorities are concatenated, and the corresponding PUCCH resource set is selected according to the number of bits after concatenation. Then, a PUCCH resource is selected by the PRI field of the high priority last DCI from the PUCCH resource set to transmit the concatenated bits.

Scheme 3: Construct the HARQ-ACK of high priority and low priority into a same codebook. Specifically, if the multiplexing indicator configured in DCI or RRC parameter indicate that the UE can multiplex the channel with different priorities, the UE ignore the priority index, and construct all the HARQ-ACK bit(s) to a same codebook. For the dynamic codebook, a HARQ-ACK codebook is constructed based on the continuous downlink assignment index (DAI) value between the high priority DCI and low priority DCI. For the semi-static codebook, a HARQ-ACK codebook is constructed according to the set of PDSCH receiving occasion of high priority HARQ-ACK and low priority HARQ-ACK.

II. Embodiment 2: Overlapping Between High Priority SR and Low Priority HARQ-ACK The gNB indicates to a UE whether the high priority scheduling request (SR) can be multiplexed with the low priority channel by higher layer signaling, e.g., RRC parameter, in SR resource. If the PUCCH resources carrying high priority SR are overlapping with the PUCCH resources carrying low priority HARQ-ACK, the UE decides whether to multiplex the SR and HARQ-ACK according to this RRC parameter.

If the higher layer signaling indicates to the UE that the high priority SR cannot be multiplexed with the low priority channel, the low priority HARQ-ACK is dropped by the UE and only the high priority SR is transmitted by the UE.

If the higher layer signaling indicates to the UE that the high priority SR can be multiplexed with the low priority channel, the following scheme can be implemented when the multiplexing timeline are met (e.g., if a time between the first HARQ ACK and the PDCCH that scheduled the PDSCH corresponding to the HARQ-ACK is greater than or equal to a threshold value to enable sufficient time for a multiplexing operation):

If the high priority SR uses PUCCH format 0 for transmission, the low priority HARQ-ACK uses PUCCH format 0 for transmission. When the SR is positive, the different sequences of the SR indicate the combination of different states of the SR and HARQ-ACK, where the sequences are associated with the $m_{CS}$ values, and the multiplexed information is always transmitted on the SR PUCCH resource. A positive SR can indicate that the information containing the scheduling request will be transmitted from UE side to gNB side. When the positive SR uses PUCCH format 0 to transmit, a specific sequence represents the positive, e.g., $m_{CS}$=0. When the positive SR uses PUCCH format 1 to transmit, the bit value in this PUCCH format 1 may be 1. For example:

If the state of the high priority SR is positive and the low priority HARQ-ACK=0, then $m_{CS}$=3.

If the state of the high priority SR is positive and the low priority HARQ-ACK=1, then $m_{CS}$=9.

When the SR state is negative (or when SR indicates that it does not need resources for uplink transmission), only HARQ-ACK is transmitted. A negative SR can indicate that the UE does not send any information to the gNB although the PUCCH resource can be configured.

If the high priority SR uses PUCCH format 1 for transmission, the low priority HARQ-ACK uses PUCCH format 0 for transmission. When SR is positive, the different bits of PUCCH format 1 of high priority SR will be used to carry high priority SR, and different sequences of PUCCH format 1 of high priority SR will be used to carry low priority HARQ-ACK. For example, The state of high priority SR is positive, and the state of low priority HARQ-ACK is 1 bit.
If HARQ-ACK=0, then the bit before modulation on PUCCH format 1 is b(0)=1, and the cyclic shift is $m_{CS}$=3.
If HARQ-ACK=1, then the bit before modulation on PUCCH format 1 is b(0)=1 and the cyclic shift is $m_{CS}$=9.

The state of high priority SR is positive, and the state of low priority HARQ-ACK is 2 bits.
If HARQ-ACK={0, 0}, then the bit before modulation on PUCCH format 1 is b(0)=1, and the cyclic shift is $m_{CS}$=1.
If HARQ-ACK={0, 1}, then the bit before modulation on PUCCH format 1 is b(0)=1, and the cyclic shift is $m_{CS}$=1.
If HARQ-ACK={1, 0}, then the bit before modulation on PUCCH format 1 is b(0)=1, and the cyclic shift is $m_{CS}$=7.
If HARQ-ACK={1, 1}, then the bit before modulation on PUCCH format 1 is b(0)=1, and the cyclic shift is $m_{CS}$=10.

When the SR state is negative, only HARQ-ACK is transmitted.

Beneficial effect: In this method, multiplexed information is always transmitted on the PUCCH resource of SR, and the delay of high priority services is not affected. At the same time, the sequence information of PUCCH format 1 is fully utilized to save time-frequency resources.

III. Embodiment 3: Overlapping Between High Priority HARQ-ACK and Low Priority Physical Uplink Shared Channel (PUSCH)

The gNB indicate s to a UE whether the high priority HARQ-ACK can be multiplexed with the low priority channel by (1) a new multiplexing indicator field in DCI that schedule the PDSCH corresponding to the high priority HARQ-ACK or (2) higher layer signaling, e.g., RRC parameter, in PUCCH resource. When the time domain overlapping occurs between the PUCCH resource of the high priority HARQ-ACK and the low priority PUSCH, the multiplexing indicator in DCI or the configuration parameter in RRC signaling can be used to determine whether the high priority HARQ-ACK can be multiplexed with the low priority PUSCH.

If DCI or higher layer signaling indicates to a UE that the high priority HARQ-ACK cannot be multiplexed with the low priority channel, the low priority PUSCH will be dropped by the UE and only the high priority HARQ-ACK will be transmitted by the UE.

If DCI or higher layer signaling indicates to a UE that the high priority HARQ-ACK can be multiplexed with the low priority channel, the modulation symbol of the high priority HARQ-ACK is mapped to the time-frequency resources after the first DMRS on the low priority PUSCH shown in FIG. 1 under the condition of timeline.

Beneficial effect: Mapping start from the first DMRS can reduce the delay of high priority HARQ-ACK. At the same time, the channel estimation result on the time-frequency resources close to the DMRS symbol is relatively accurate, which helps improve the reliability of the high priority HARQ-ACK.

Iv. Embodiment 4: Overlapping Between High Priority HARQ-ACK, High Priority SR and Low Priority HARQ-ACK The gNB indicates to a UE whether the high priority HARQ-ACK can be multiplexed with the low priority channel by a new multiplexing indicator field in DCI that schedule the PDSCH corresponding to the high priority HARQ-ACK or by RRC configuration in PUCCH resource. At the same time, the gNB indicates to a UE whether the high priority SR can be multiplexed with the low priority channel by RRC configuration in SR resource.

If the time domain overlapping between the three channels are occurred, perform the following steps to solve the time domain overlap between the three channels:

Step 1: If the DCI corresponding to the high priority HARQ-ACK or the RRC parameter indicates to a UE that the high priority HARQ-ACK can be multiplexed with the low priority channel, the UE concatenates the high priority HARQ-ACK bits and the low priority HARQ-ACK bits into a new codebook, and the UE selects the corresponding PUCCH resource set according to the number of bits after concatenation. Then, the UE selects a PUCCH resource to transmit concatenated bit from the PUCCH resource set according to the PRI field in the last DCI that schedule the high priority transmission. The UE regards the multiplexed HARQ-ACK codebook as a high priority.

Step 2: If the UE determines that the new PUCCH resource obtained from Step 1 still overlap with the high priority SR, the UE continues to concatenate the SR to the new HARQ-ACK codebook obtained from Step 1, and the UE selects the corresponding PUCCH resource set according to the number of bits after concatenation. Then, the UE selects a PUCCH resource to transmit concatenated bit from the PUCCH resource set according to the PRI field in the last DCI that schedule the high priority transmission.

Beneficial effect: With the multi-channel time domain overlapping resolution described in this example, the uplink control information (UCIs) of the three channel can be transmitted to the gNB at the same time if they are allowed to be multiplexing by DCI indicator or RRC configuration. In addition, these UCI PUCCH resources are always of high priority, which ensures that the reliability of the high priority services is not affected.

V. Embodiment 5: Overlapping Between High Priority HARQ-ACK, High Priority PUSCH and Low Priority HARQ-ACK The gNB indicates to a UE whether the high priority HARQ-ACK can be multiplexed with the low priority channel by a new multiplexing indicator field in DCI that schedule the PDSCH corresponding to the high priority HARQ-ACK or by RRC configuration in PUCCH resource. At the same time, the gNB indicate whether the high priority PUSCH can be multiplexed with the low priority channel by DCI multiplexing indicator or RRC.

If the time domain overlapping between the three channels are occurred, perform the following steps to solve the time domain overlap between the three channels:

Step 1: If the DCI corresponding to the high priority HARQ-ACK or the RRC parameter indicates to the UE that the high priority HARQ-ACK can be multiplexed with the low priority channel, the UE concatenates the high priority HARQ-ACK bits and the low priority HARQ-ACK bits into a new codebook, and the UE selects the corresponding PUCCH resource set according to the number of bits after concatenation. Then, the UE selects a PUCCH resource to transmit concatenated bit from the PUCCH resource set according to the PRI field in the last DCI that schedule the high priority transmission. Regard the multiplexed HARQ-ACK codebook as a high priority.

Step 2: If the UE determines that new HARQ-ACK codebook obtained from Step 1 still overlaps with the high priority PUSCH, the UE continues to multiplex the HARQ-ACK codebook obtained in Step 1 with the high priority PUSCH. The DAI value in PUSCH should be the total of high priority HARQ-ACK and low priority HARQ-ACK bits.

Beneficial effect: If multiplexing is allowed by DCI indicator or RRC configuration, the bit concatenation of HARQ-ACK in the high and low priorities is performed in this example. As the total number of bits will change after concatenation, it is possible to select a new PUCCH resources to transmit the multiplexed information. This will prevent the overlapped time domains of the HARQ-ACK and the PUSCH. Even if the new HARQ-ACK still overlaps with the PUSCH in the time domain, all information can be transmitted to the gNB through multiplexing.

Vi. Embodiment 6: Overlapping Between High Priority HARQ-ACK, Low Priority PUSCH, and Low Priority HARQ-ACK The gNB indicates to a UE whether the high priority HARQ-ACK can be multiplexed with the low priority channel by a new multiplexing indicator field in DCI that schedule the PDSCH corresponding to the high priority HARQ-ACK or by RRC configuration in PUCCH resource.

If the time domain overlapping between the three channels are occurred, perform the following steps to solve the time domain overlap between the three channels:

Step 1: If the DCI corresponding to the high priority HARQ-ACK or the RRC parameter indicates to a UE that the high priority HARQ-ACK can be multiplexed with the low priority channel, the UE concatenates the high priority HARQ-ACK bits and the low priority HARQ-ACK bits into a new codebook, and the UE selects the corresponding PUCCH resource set according to the number of bits after concatenation. Then, the UE selects a PUCCH resource to transmit concatenated bit from the PUCCH resource set according to the PRI f in the last DCI that schedule the high priority transmission. Regard the multiplexed HARQ-ACK codebook as a high priority.

Step 2: If the UE determines that the new HARQ-ACK codebook obtained from Step 1 still overlaps with the high priority PUSCH, the UE continues to multiplex the HARQ-ACK codebook obtained from Step 1 with the high priority PUSCH, or drop the low priority PUSCH and only transmit the HARQ-ACK obtained in Step 1.

Beneficial effect: If multiplexing is allowed by DCI indicator or RRC configuration, this example first performs bit concatenation of high priority and low priority HARQ-ACK. As the total number of bits will change after concatenation, it is possible to select a new PUCCH resources to transmit the multiplexed information. In this way, the overlapping between HARQ-ACK and PUSCH will be avoided, and all the overlapped channels in the time domain will be transmitted without being dropped.

The following section describes example techniques to manage a high priority channel overlapping with a low priority channel.

When the PUCCH carrying high priority HARQ-ACK overlaps with the PUCCH carrying low priority HARQ-ACK in time domain, no matter which PUCCH format in this two PUCCH resource are, the PRI of last DCI scheduling the high priority transmission is always used to select a PUCCH resource for transmitting the multiplexed information. For details, refer to scheme 1 in embodiment 1.

When the PUCCH carrying high priority HARQ-ACK overlaps with the PUCCH carrying low priority HARQ-ACK in time domain, if these two HARQ-ACKs all are less than or equal to 2 bits, different sequences, different bits, and different PUCCH resources are used to indicate the different states of these two HARQ-ACK. For details, refer to scheme 2 in embodiment 1.

When the PUCCH carrying high priority HARQ-ACK overlaps with the PUCCH carrying low priority HARQ-ACK in time domain, the UE constructs the HARQ-ACKs for different priorities in a same HARQ-ACK codebook. For details, refer to scheme 3 in embodiment 1.

When the PUCCH carrying high priority SR overlaps with the PUCCH carrying low priority HARQ-ACK in time domain, the multiplexed information is always transmitted on the PUCCH resource carrying the high priority SR. Different states of the HARQ-ACK are represented by different sequences and/or different bits of this PUCCH resource. For details, refer to embodiment 2.

When the PUCCH carrying high priority HARQ-ACK overlaps with the low priority PUSCH, the UE maps the HARQ-ACK to the resource element (RE) that is located after the first DMRS of PUSCH. For details, refer to embodiment 3.

When the overlapping in time domain are occurred between more than two uplink channel, the same-type UCIs are multiplexed first if they are allowed to be multiplexing by DCI indicator or RRC configuration, and then different-type UCIs or PUSCHs are multiplexed. For details, refer to embodiment 4, embodiment 5, and embodiment 6.

Figure 2:
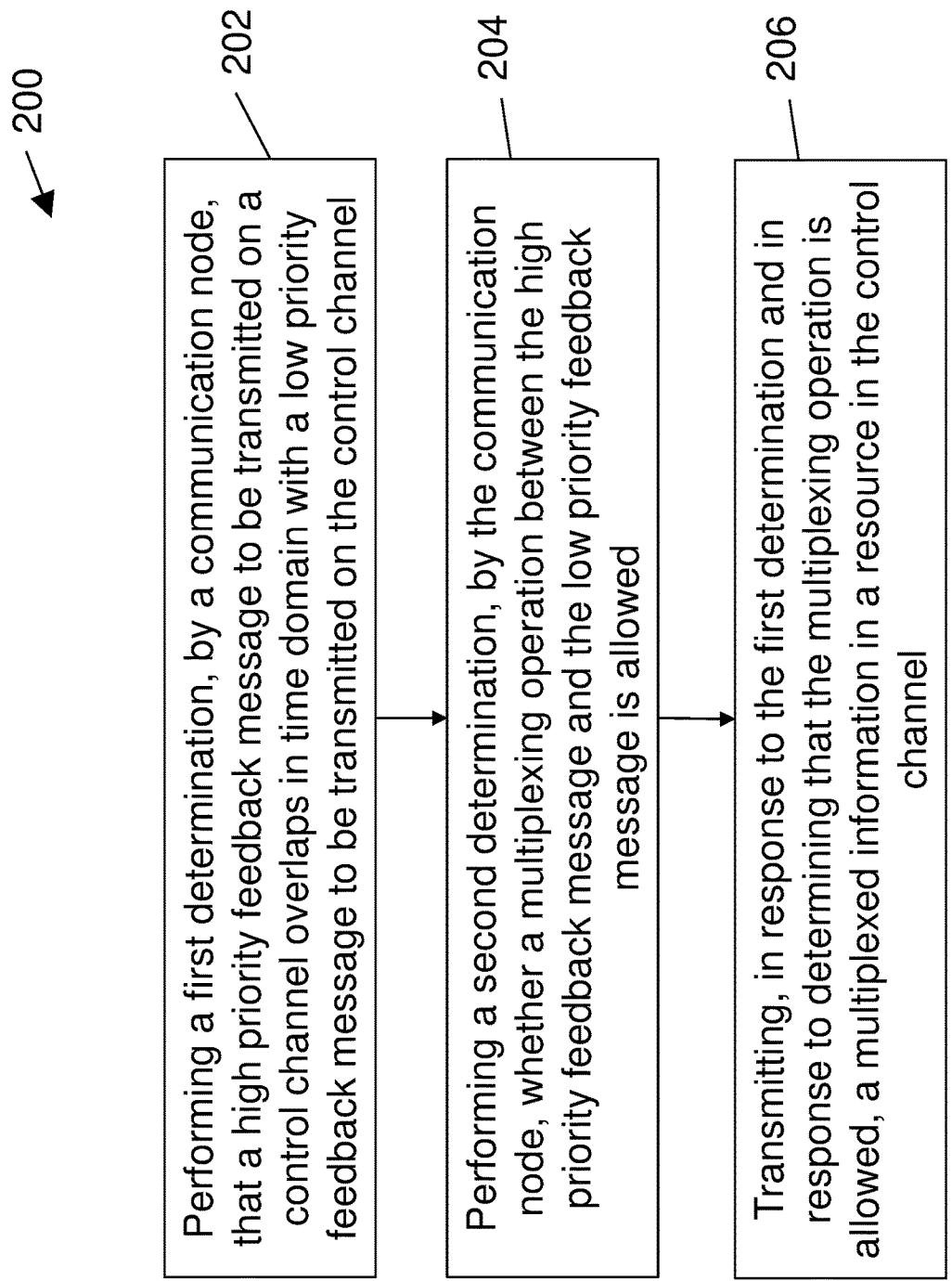
FIGS. 2 to 4 show three flowcharts of exemplary multiplexing techniques for overlapping channels with different priorities.

FIG. 2 shows a first flowchart 200 of an exemplary multiplexing technique for overlapping channels with different priorities. Operation 202 includes performing a first determination, by a communication node, that a high priority feedback message to be transmitted on a control channel overlaps in time domain with a low priority feedback message to be transmitted on the control channel. Operation 204 includes performing a second determination, by the communication node, whether a multiplexing operation between the high priority feedback message and the low priority feedback message is allowed. Operation 206 includes transmitting, in response to the first determination and in response to determining that the multiplexing operation is allowed, a multiplexed information in a resource in the control channel, where the multiplexed information comprises the high priority feedback message multiplexed with the low priority feedback message, and where the resource is selected based on a resource indicator indicated by a control information that schedules a shared channel corresponding to the high priority feedback message on the control channel.

In some embodiments of method 200, the method further comprises transmitting, in response to the first determination and in response to determining that the multiplexing operation is not allowed, only the high priority feedback message in the resource in the control channel. In some embodiments of method 200, the high priority feedback message includes a high priority hybrid automatic repeat request acknowledgement (HARQ-ACK) message, and the low priority feedback message includes a low priority hybrid automatic repeat request acknowledgement (HARQ-ACK) message. In some embodiments of method 200, the control channel includes a physical uplink control channel (PUCCH), the shared channel includes a physical uplink shared channel (PUSCH), the control information includes a downlink control information (DCI), and the resource indicator associated with the control channel includes a PUCCH resource indicator (PRI).

Figure 3:
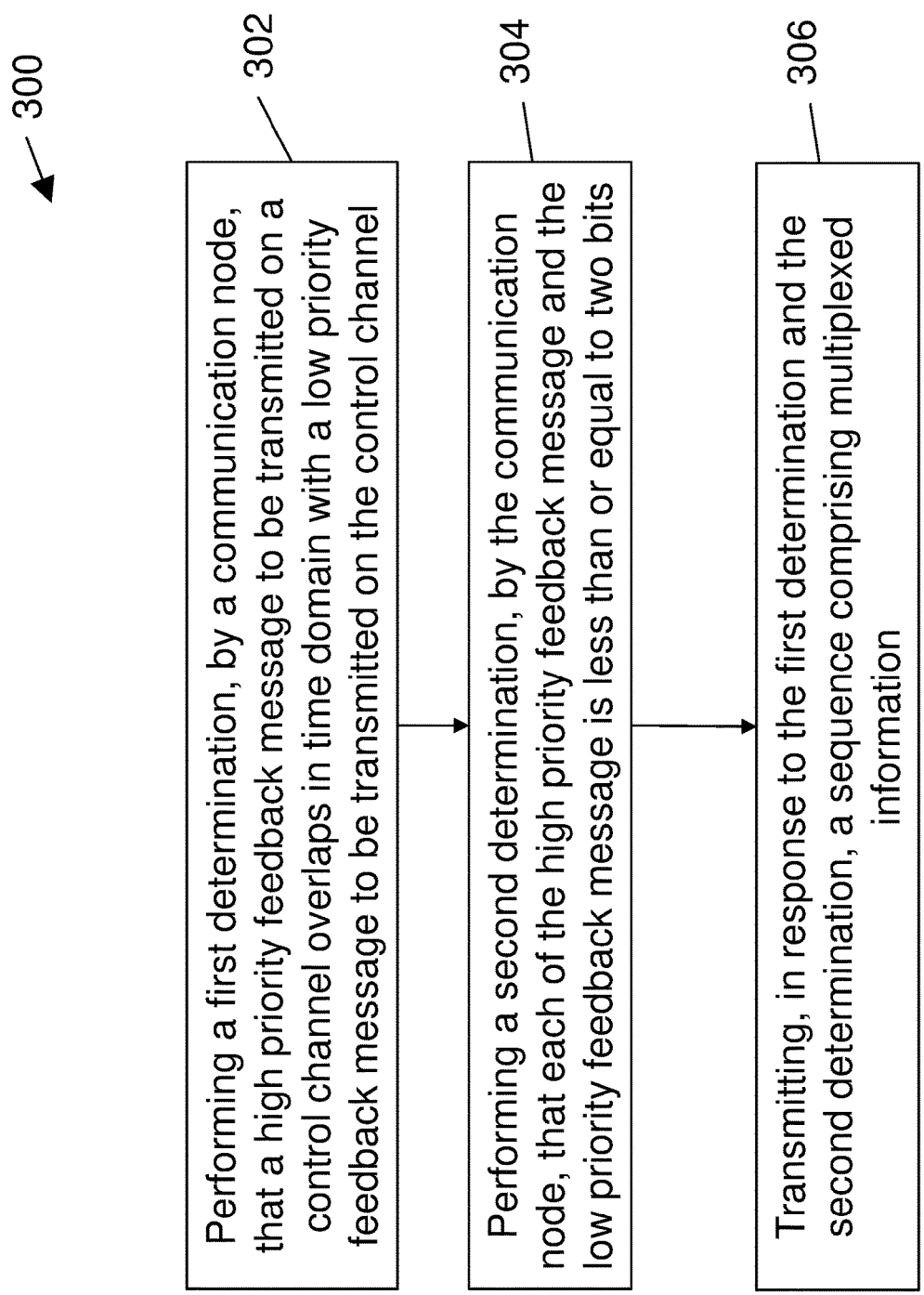

FIG. 3 shows a second flowchart 300 of an exemplary multiplexing technique for overlapping channels with different priorities. Operation 302 includes performing a first determination, by a communication node, that a high priority feedback message to be transmitted on a control channel overlaps in time domain with a low priority feedback message to be transmitted on the control channel. Operation 304 includes performing a second determination, by the communication node, that each of the high priority feedback message and the low priority feedback message is less than or equal to two bits. Operation 306 includes transmitting, in response to the first determination and the second determination, a sequence comprising multiplexed information, where the multiplexed information comprises the high priority feedback message multiplexed with the low priority feedback message, where the sequence is transmitted in a resource in the control channel, and where the sequence is selected based on a first set of one or more bits of the high priority feedback message and based on a second set of one or more bits of the low priority feedback message.

In some embodiments of method 300, the resource is selected based on values of the low priority feedback message and the high priority feedback message. In some embodiments of method 300, the resource is configured for transmission of the low priority feedback message on the control channel. In some embodiments of method 300, the resource is configured for transmission of the high priority feedback message on the control channel. In some embodiments of method 300, the high priority feedback message includes a high priority hybrid automatic repeat request acknowledgement (HARQ-ACK) message, and the low priority feedback message includes a low priority hybrid automatic repeat request acknowledgement (HARQ-ACK) message. In some embodiments of method 300, the control channel includes a physical uplink control channel (PUCCH).

Figure 4:
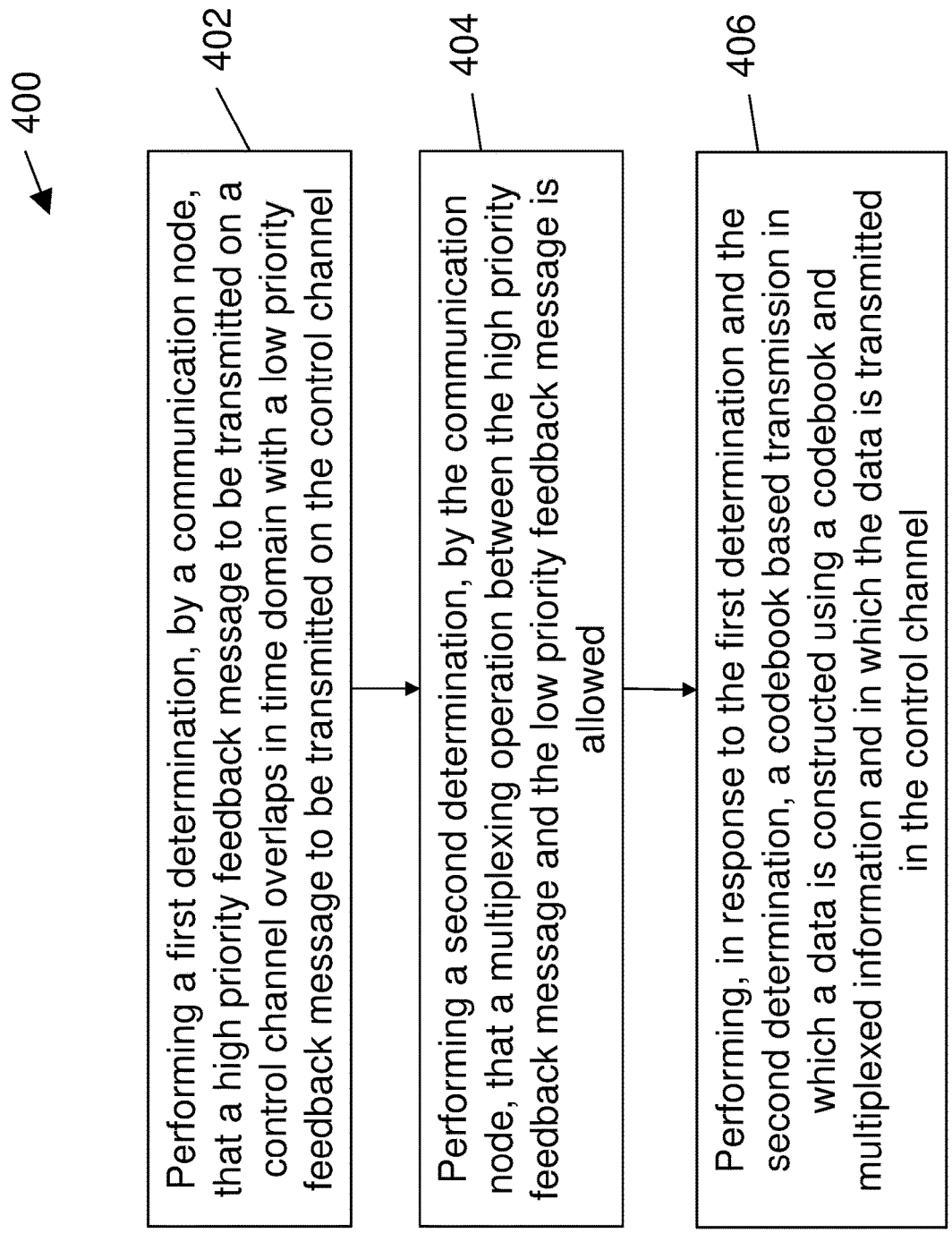

FIG. 4 shows a third flowchart 400 of an exemplary multiplexing technique for overlapping channels with different priorities. Operation 402 performing a first determination, by a communication node, that a high priority feedback message to be transmitted on a control channel overlaps in time domain with a low priority feedback message to be transmitted on the control channel. Operation 404 includes performing a second determination, by the communication node, that a multiplexing operation between the high priority feedback message and the low priority feedback message is allowed. Operation 406 includes performing, in response to the first determination and the second determination, a codebook based transmission in which a data is constructed using a codebook and multiplexed information and in which the data is transmitted in the control channel, where the multiplexed information comprises the high priority feedback message multiplexed with the low priority feedback message.

In some embodiments of method 400, the codebook is a dynamic codebook, and the data is constructed using a continuous downlink assignment index (DAI) value between a high priority downlink control information (DCI) associated with the high priority feedback message and a low priority DCI associated with the low priority feedback message. In some embodiments of method 400, the codebook is a semi-static codebook, and the data is constructed according to a set of physical downlink shared channel (PDSCH) receiving occasions corresponding to the high priority feedback message and the low priority feedback message. In some embodiments of method 400, the second determination is performed based on a multiplexing indicator that indicates that the multiplexing operation is allowed. In some embodiments of method 400, the multiplexing indicator is indicated to the communication node via a downlink control information (DCI) or a radio resource control (RRC) information. In some embodiments of method 400, the control channel includes a physical uplink control channel (PUCCH).

Figure 6:
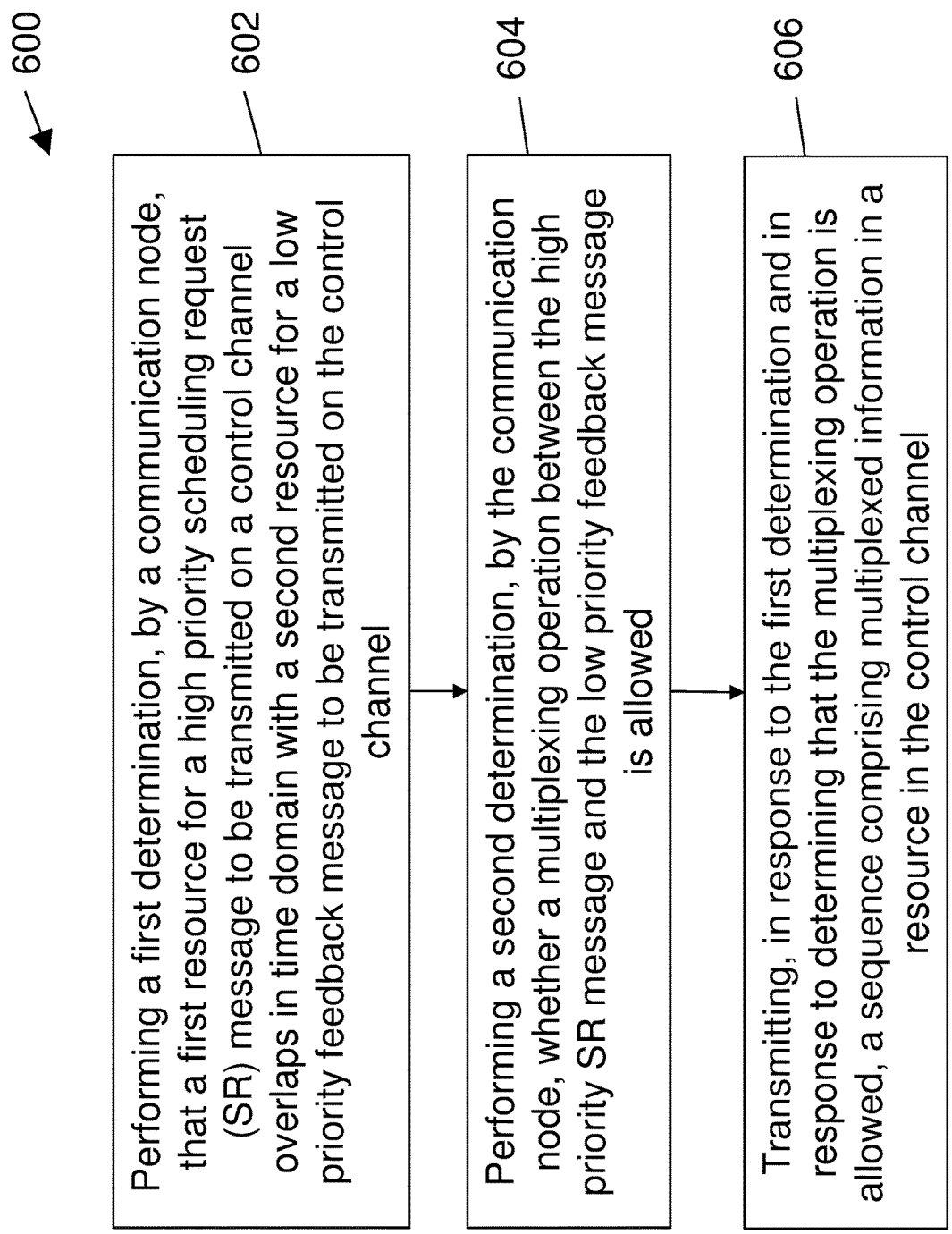
FIGS. 6 to 8 show three additional flowcharts of exemplary multiplexing techniques for overlapping channels with different priorities.

FIG. 6 shows a fourth flowchart 600 of an exemplary multiplexing technique for overlapping channels with different priorities. Operation 602 includes performing a first determination, by a communication node, that a first resource for a high priority scheduling request (SR) message to be transmitted on a control channel overlaps in time domain with a second resource for a low priority feedback message to be transmitted on the control channel. Operation 604 includes performing a second determination, by the communication node, whether a multiplexing operation between the high priority SR message and the low priority feedback message is allowed. Operation 606 includes transmitting, in response to the first determination and in response to determining that the multiplexing operation is allowed, a sequence comprising multiplexed information in a resource in the control channel, where the multiplexed information comprises the high priority SR message multiplexed with the low priority feedback message, where the sequence is selected based on the high priority SR message indicating a request for transmission and based on one or more bits of the low priority feedback message, and where the resource is configured for transmission of the high priority SR message.

In some embodiments of method 600, the method further comprises transmitting the low priority feedback message on the control channel in response to the high priority SR message indicating that resources are not needed for transmission. In some embodiments of method 600, the low priority feedback message includes a low priority hybrid automatic repeat request acknowledgement (HARQ-ACK) message. In some embodiments of method 600, the control channel includes a physical uplink control channel (PUCCH).

Figure 7:
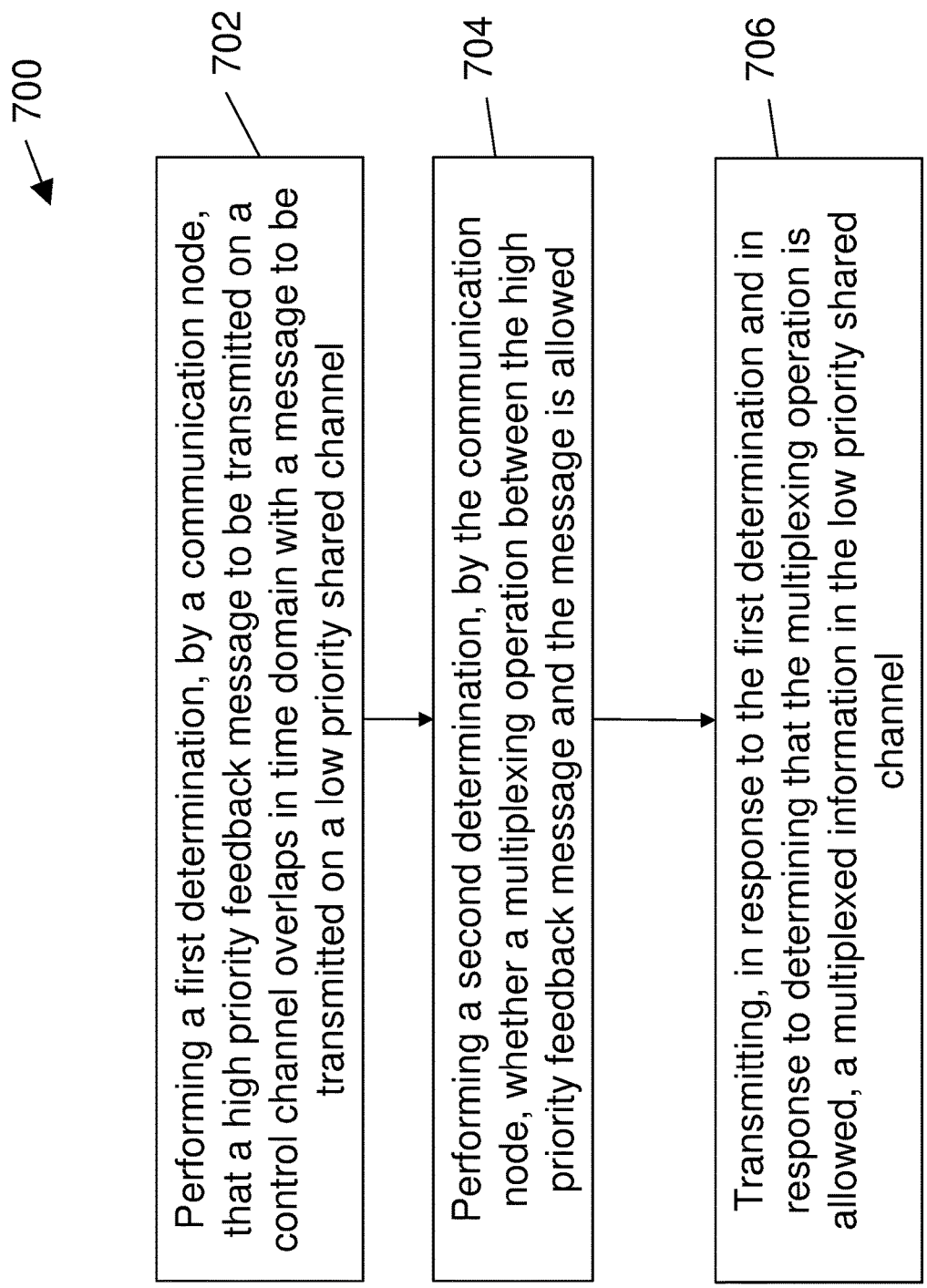

FIG. 7 shows a fifth flowchart 700 of an exemplary multiplexing technique for overlapping channels with different priorities. Operation 702 includes performing a first determination, by a communication node, that a high priority feedback message to be transmitted on a control channel overlaps in time domain with a message to be transmitted on a low priority shared channel. Operation 704 includes performing a second determination, by the communication node, whether a multiplexing operation between the high priority feedback message and the message is allowed. Operation 706 includes transmitting, in response to the first determination and in response to determining that the multiplexing operation is allowed, a multiplexed information in the low priority shared channel, where the multiplexed information comprises the high priority feedback message multiplexed with the message, and where a modulation symbol of the high priority feedback message is mapped to time-frequency resources that are located after those of a first demodulation reference signal (DMRS) on the low priority shared channel.

In some embodiments of method 700, the second determination is performed based on a multiplexing indicator that indicates that the multiplexing operation is allowed. In some embodiments of method 700, the multiplexing indicator is indicated to the communication node via a downlink control information (DCI) or a radio resource control (RRC) information. In some embodiments of method 700, the method further comprises transmitting, in response to the first determination and in response to determining that the multiplexing operation is not allowed, only the high priority feedback message. In some embodiments of method 700, the high priority feedback message includes a high priority hybrid automatic repeat request acknowledgement (HARQ-ACK) message. In some embodiments of method 700, the control channel includes a physical uplink control channel (PUCCH), and the low priority shared channel includes a low priority physical uplink shared channel (PUSCH).

Figure 8:
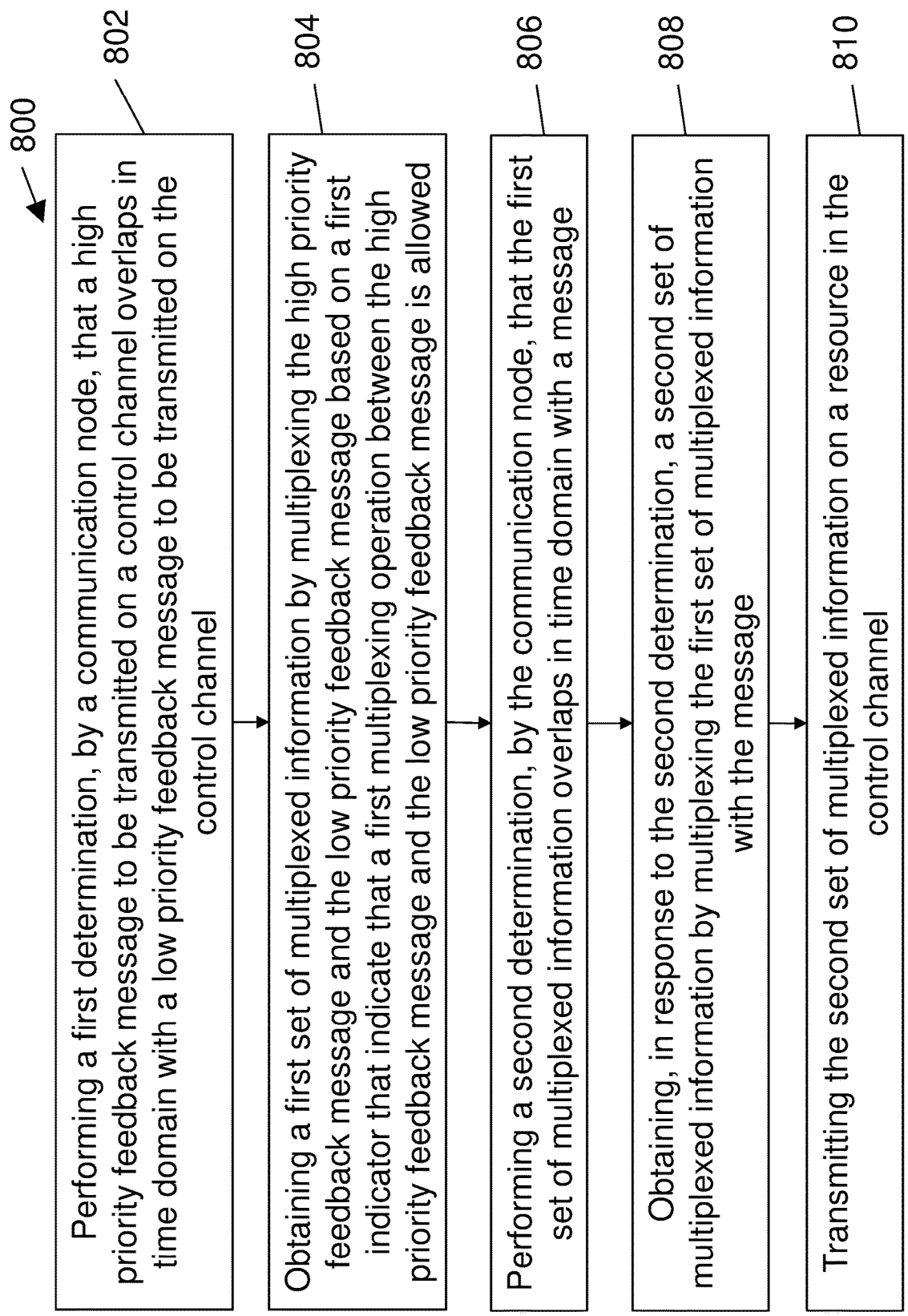

FIG. 8 shows a sixth flowchart 800 of an exemplary multiplexing technique for overlapping channels with different priorities. Operation 802 includes performing a first determination, by a communication node, that a high priority feedback message to be transmitted on a control channel overlaps in time domain with a low priority feedback message to be transmitted on the control channel. Operation 804 includes obtaining a first set of multiplexed information by multiplexing the high priority feedback message and the low priority feedback message based on a first indicator that indicate that a first multiplexing operation between the high priority feedback message and the low priority feedback message is allowed. Operation 806 includes performing a second determination, by the communication node, that the first set of multiplexed information overlaps in time domain with a message. Operation 808 includes obtaining, in response to the second determination, a second set of multiplexed information by multiplexing the first set of multiplexed information with the message. Operation 810 includes transmitting the second set of multiplexed information on a resource in the control channel.

In some embodiments of method 800, the message comprises a high priority scheduling request (SR) message to be transmitted on the control channel. In some embodiments of method 800, the resource is selected based on a resource indicator indicated by a control information that schedules the high priority feedback message on the control channel. In some embodiments of method 800, the message is to be transmitted on a high priority physical uplink shared channel (PUSCH). In some embodiments of method 800, the message is to be transmitted on a low priority physical uplink shared channel (PUSCH). In some embodiments of method 800, the control channel includes a physical uplink control channel (PUCCH).

Figure 5:
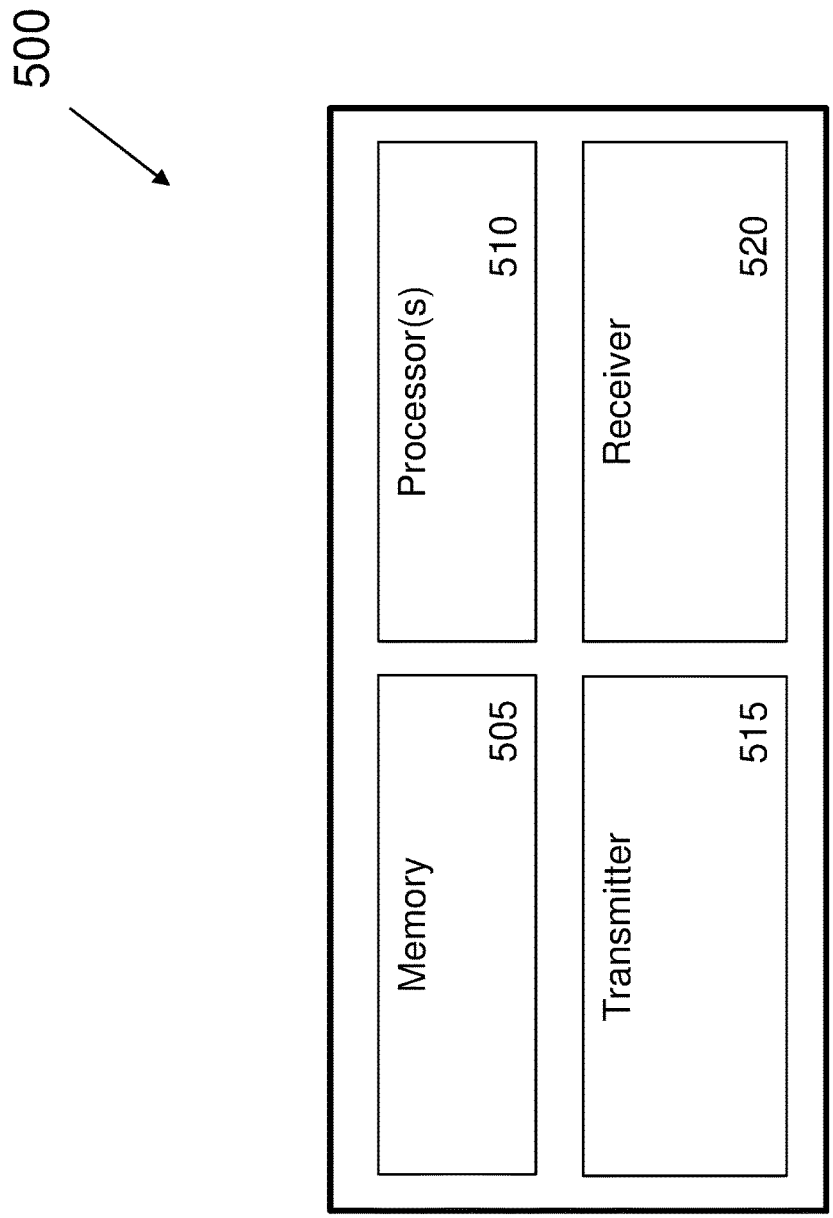
FIG. 5 shows an exemplary block diagram of a hardware platform 500 that may be a part of a network node or a user equipment.

FIG. 5 shows an exemplary block diagram of a hardware platform that may be a part of a network node or a user equipment. The hardware platform 500 includes at least one processor 510 and a memory 505 having instructions stored thereupon. The instructions upon execution by the processor 510 configure the hardware platform 500 to perform the operations described in FIGS. 1 to 4 and 6 to 8 and in the various embodiments described in this patent document. The transmitter 515 transmits or sends information or data to another node. For example, a network node transmitter can send a message to a user equipment. The receiver 520 receives information or data transmitted or sent by another node. For example, a user equipment can receive a message from a network node.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
performing a first determination, by a communication node, that a control channel with a high priority feedback message to be transmitted overlaps in time domain with another control channel with a low priority feedback message to be transmitted;
performing a second determination, by the communication node, that a multiplexing operation between the high priority feedback message and the low priority feedback message is allowed based on a Radio Resource Control (RRC) parameter, wherein each of the high priority feedback message and the low priority feedback message is less than or equal to two bits; and
transmitting, in response to the first determination and the second determination, a sequence representing multiplexed information,
wherein the multiplexed information represents the high priority feedback message multiplexed with the low priority feedback message,
wherein the sequence is transmitted in the control channel, and wherein the sequence is selected based on a first set of one or more bits of the high priority feedback message and based on a second set of one or more bits of the low priority feedback message.

2. The method of claim 1, wherein a resource for transmitting the sequence is selected based on values of the low priority feedback message and the high priority feedback message.

3. The method of claim 1, wherein a resource for transmitting the sequence is configured for transmission of the low priority feedback message on the control channel.

4. The method of claim 1, wherein a resource for transmitting the sequence is configured for transmission of the high priority feedback message on the control channel.

5. The method of claim 1,
wherein the high priority feedback message includes a high priority hybrid automatic repeat request acknowledgement (HARQ-ACK) message, and
wherein the low priority feedback message includes a low priority hybrid automatic repeat request acknowledgement (HARQ-ACK) message.

6. The method of claim 1, wherein the control channel includes a physical uplink control channel (PUCCH).

7. A wireless communication apparatus comprising a processor configured to implement a method, the processor configured to:
perform a first determination, by a communication node, that a control channel with a high priority feedback message to be transmitted overlaps in time domain with another control channel with a low priority feedback message to be transmitted;
perform a second determination, by the communication node, that a multiplexing operation between the high priority feedback message and the low priority feedback message is allowed based on a Radio Resource Control (RRC) parameter, wherein each of the high priority feedback message and the low priority feedback message is less than or equal to two bits; and
transmit, in response to the first determination and the second determination, a sequence representing multiplexed information,
wherein the multiplexed information represents the high priority feedback message multiplexed with the low priority feedback message,
wherein the sequence is transmitted in the control channel, and
wherein the sequence is selected based on a first set of one or more bits of the high priority feedback message and based on a second set of one or more bits of the low priority feedback message.

8. The wireless communication apparatus of claim 7, wherein a resource for transmitting the sequence is selected based on values of the low priority feedback message and the high priority feedback message.

9. The wireless communication apparatus of claim 7, wherein a resource for transmitting the sequence is configured for transmission of the low priority feedback message on the control channel.

10. The wireless communication apparatus of claim 7, wherein a resource for transmitting the sequence is configured for transmission of the high priority feedback message on the control channel.

11. The wireless communication apparatus of claim 7,
wherein the high priority feedback message includes a high priority hybrid automatic repeat request acknowledgement (HARQ-ACK) message, and
wherein the low priority feedback message includes a low priority hybrid automatic repeat request acknowledgement (HARQ-ACK) message.

12. The wireless communication apparatus of claim 7, wherein the control channel includes a physical uplink control channel (PUCCH).

13. A non-transitory computer readable program storage medium having code stored thereon, the code, when executed by a processor, causing the processor to implement a method, comprising:
performing a first determination, by a communication node, that a control channel with a high priority feedback message to be transmitted on a control channel overlaps in time domain with another control channel with a low priority feedback message to be transmitted on the control channel;
performing a second determination, by the communication node, that a multiplexing operation between the high priority feedback message and the low priority feedback message is allowed based on a Radio Resource Control (RRC) parameter, wherein each of the high priority feedback message and the low priority feedback message is less than or equal to two bits; and
transmitting, in response to the first determination and the second determination, a sequence representing multiplexed information,
wherein the multiplexed information represents the high priority feedback message multiplexed with the low priority feedback message,
wherein the sequence is transmitted in the control channel, and
wherein the sequence is selected based on a first set of one or more bits of the high priority feedback message and based on a second set of one or more bits of the low priority feedback message.

14. The non-transitory computer readable program storage medium of claim 13, wherein a resource for transmitting the sequence is selected based on values of the low priority feedback message and the high priority feedback message.

15. The non-transitory computer readable program storage medium of claim 13, wherein a resource for transmitting the sequence is configured for transmission of the low priority feedback message on the control channel.

16. The non-transitory computer readable program storage medium of claim 13, wherein a resource for transmitting the sequence is configured for transmission of the high priority feedback message on the control channel.

17. The non-transitory computer readable program storage medium of claim 13,
wherein the high priority feedback message includes a high priority hybrid automatic repeat request acknowledgement (HARQ-ACK) message, and
wherein the low priority feedback message includes a low priority hybrid automatic repeat request acknowledgement (HARQ-ACK) message.

18. The non-transitory computer readable program storage medium of claim 13, wherein the control channel includes a physical uplink control channel (PUCCH).

* * * * *